US011321618B2

(12) United States Patent
Nonaka et al.

(10) Patent No.: US 11,321,618 B2
(45) Date of Patent: May 3, 2022

(54) LEARNING DEVICE, IMAGE PICKUP APPARATUS, IMAGE PROCESSING DEVICE, LEARNING METHOD, NON-TRANSIENT COMPUTER-READABLE RECORDING MEDIUM FOR RECORDING LEARNING PROGRAM, DISPLAY CONTROL METHOD AND INFERENCE MODEL MANUFACTURING METHOD

(71) Applicant: OLYMPUS CORPORATION, Hachioji (JP)

(72) Inventors: Osamu Nonaka, Sagamihara (JP); Kazuhiko Osa, Hachioji (JP); Yoichi Yoshida, Inagi (JP); Hirokazu Nozaki, Hachioji (JP); Masahiro Fujimoto, Hachioji (JP); Hidekazu Iwaki, Hachioji (JP); Koji Sakai, Hino (JP); Keiji Okada, Hino (JP); Yoshihisa Ogata, Hachioji (JP)

(73) Assignee: OM DIGITAL SOLUTIONS CORPORATION, Tokyo (JP)

( * ) Notice: Subject to any disclaimer, the term of this patent is extended or adjusted under 35 U.S.C. 154(b) by 233 days.

(21) Appl. No.: 16/393,585

(22) Filed: Apr. 24, 2019

(65) Prior Publication Data
US 2019/0332952 A1 Oct. 31, 2019

(30) Foreign Application Priority Data

Apr. 25, 2018 (JP) .............................. JP2018-084018
May 15, 2018 (JP) .............................. JP2018-093949

(51) Int. Cl.
*G06N 5/04* (2006.01)
*G06N 20/00* (2019.01)
*G06T 7/00* (2017.01)

(52) U.S. Cl.
CPC ............... *G06N 5/04* (2013.01); *G06N 20/00* (2019.01); *G06T 7/97* (2017.01); *G06T 2207/20081* (2013.01); *G06T 2207/20224* (2013.01)

(58) Field of Classification Search
CPC .......... G06N 5/04; G06N 20/00; G06N 5/041; G06N 3/0454; G06N 3/08; G06T 7/97;
(Continued)

(56) References Cited

U.S. PATENT DOCUMENTS 10,129,456 B1 * 11/2018 Kim .................... H04N 5/23212
10,599,984 B1 * 3/2020 Wubbels ................ G16H 30/40
(Continued)

FOREIGN PATENT DOCUMENTS

JP  2015109068 A  6/2015
JP  2017091525 A  5/2017

*Primary Examiner* — Wesley J Tucker
(74) *Attorney, Agent, or Firm* — Volpe Koenig

(57) ABSTRACT

An image pickup system includes an input/output modeling section 24, the input/output modeling section 24 creating, as a population, an image group obtained when a specific target is photographed, (access image), and generating an inference model by using, as teacher data, sequential images selected from the image group created as the population, based on whether the specific target can be accessed, wherein each image of the image group is associated with date and time information and/or position information, and the input/output modeling section 24 generates an inference model for determining based on the date and time information and/or the position information whether a process to the specific target is good or bad.

15 Claims, 25 Drawing Sheets

(58) Field of Classification Search
CPC ........... G06T 2207/20224; G06T 2207/20081; G06K 9/66; G06K 9/00335
See application file for complete search history.

(56) References Cited

U.S. PATENT DOCUMENTS

| | | | |
|---|---|---|---|
| 11,010,609 B2* | 5/2021 | Shintani | G06K 9/00671 |
| 2010/0296702 A1* | 11/2010 | Hu | G06K 9/00281 |
| | | | 382/103 |
| 2016/0098636 A1* | 4/2016 | Okonogi | G06N 20/00 |
| | | | 706/12 |
| 2016/0284095 A1* | 9/2016 | Chalom | G06K 9/627 |
| 2017/0061601 A1* | 3/2017 | Bryll | H04N 5/2354 |
| 2018/0204111 A1* | 7/2018 | Zadeh | G06K 9/3233 |
| 2018/0330198 A1* | 11/2018 | Harary | G06K 9/00691 |
| 2019/0164056 A1* | 5/2019 | Hosh | G06N 5/04 |
| 2019/0260924 A1* | 8/2019 | Sudo | H04N 5/23245 |
| 2019/0286908 A1* | 9/2019 | Shintani | G06K 9/00671 |
| 2020/0074224 A1* | 3/2020 | Hayashi | G06K 9/6253 |
| 2020/0174433 A1* | 6/2020 | Hughes | G06F 16/248 |
| 2020/0250451 A1* | 8/2020 | Oda | G06N 20/20 |
| 2020/0342258 A1* | 10/2020 | Uno | G06N 3/08 |
| 2021/0117717 A1* | 4/2021 | Ha | G05B 13/048 |
| 2021/0150728 A1* | 5/2021 | Ahmed | G06N 3/08 |

\* cited by examiner

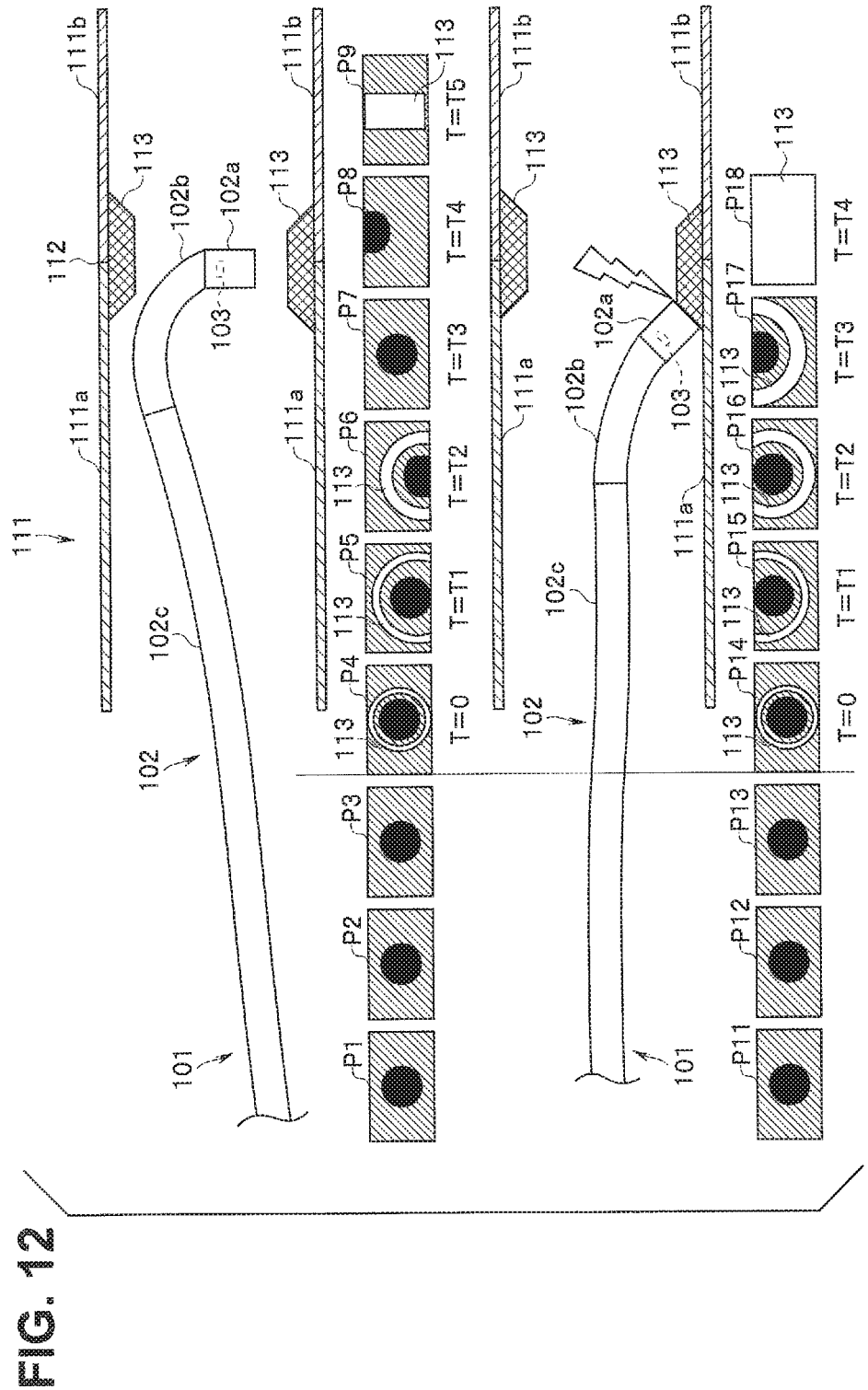

LEARNING DEVICE, IMAGE PICKUP APPARATUS, IMAGE PROCESSING DEVICE, LEARNING METHOD, NON-TRANSIENT COMPUTER-READABLE RECORDING MEDIUM FOR RECORDING LEARNING PROGRAM, DISPLAY CONTROL METHOD AND INFERENCE MODEL MANUFACTURING METHOD

CROSS REFERENCE TO RELATED APPLICATION

This application claims the benefit of Japanese Application No. 2018-084018 filed in Japan on Apr. 25, 2018 and Japanese Patent Application No. 2018-093949 filed in Japan on May 15, 2018, the contents of which are incorporated herein by this reference.

BACKGROUND OF THE INVENTION

1. Field of the Invention

The present invention relates to a learning device, an image pickup apparatus, an image processing device, a learning method, a non-transient computer-readable recording medium configured to record learning program, a display control method and an inference model manufacturing method, for outputting a guide to acquire a target image.

2. Description of the Related Art

Machine learning such as deep learning has been recently utilized. The machine learning learns features of known input information, and time-series information, space information, etc. on the known input information, and draws an inference based on a learning result, thereby acquiring an inference result on an unknown matter.

For example, researches have been in progress to determine what is photographed in an image by using deep learning. It has been proposed in Japanese Patent Application Laid-Open Publication No. 2017-091525 that images are analyzed by using inference models of the deep learning.

In the machine learning, a learned model configured to enable a determinable output result to be inferred is first obtained from specific input information. The machine learning is one of element techniques of artificial intelligence, and a neural network is known as one of algorithms of the machine learning. The neural network realizes a recognition processing imitating that a human's intracerebral is recognizing a target from various features of an image or the like by using a network of nerve cells called neurons, and is directed to realization of the intracerebral nerve network and a process using the intracerebral nerve network on a computer. The deep learning is a neural network obtained by further constructing the foregoing neutral network in the form of a multilayer, and it receives various features of an image or the like, repeats trial and error while ascertaining whether the input features are helpful to recognition, and finds the most effective recognition model, thereby performing learning.

A large amount of known information on the relationship between an input and an output are used as learning data when a learned model is generated so that an inference result is obtained with high reliability. For example, when machine learning is realized by a neural network, the neural network is designed so as to obtain an expected output for a known input. A learned model obtained by such a process (hereinafter referred to as "inference model") is available independently of the neural network which has performed learning.

Such machine learning is usable in various fields, and for example, a Watson (trademark) system for performing natural language processing to read out information and draw an inference, etc. are known. Note that Japan Patent Application Laid-Open Publication No. 2015-109068 discloses a technique of providing a mechanism, a method, a computer program and a device that identify commonality among answer candidates generated by a question and answer system of the Watson system or the like.

It is also considered to use the machine learning as described above when images are obtained by an image pickup apparatus or the like. Use of the machine learning may make it possible to easily acquire an image desired by a user.

SUMMARY OF THE INVENTION

A learning device according to an aspect of the present invention includes a processor, wherein the processor sets, as a population, a series of plural images that are obtained time-sequentially when a specific target is photographed, each of the plural images containing a part of an image just previously obtained, the plural images being traceable, and generates an inference model by using, as teacher data, sequential images selected from the set population based on whether the specific target can be accessed.

A learning device according to another aspect of the present invention includes a processor, wherein the processor sets, as a population, a series of plural images obtained time-sequentially when a specific target is photographed, receives difference data of the time-sequentially obtained images and generates an inference model.

An image pickup apparatus according to an aspect of the present invention includes: a memory configured to store the inference model, an image sensor configured to convert an object into image data, and an inference engine configured to receive the image data and perform inference by using the inference model stored in the memory.

An image processing device according to an aspect of the present invention includes an image sensor configured to convert an object into image data, a memory configured to store an inference model generated by setting, as a population, a series of plural images obtained time-sequentially when a specific target is photographed, and using, as teacher data, sequential images selected from the set population based on whether the specific target can be accessed, and an inference engine configured to use the inference model stored in the memory, receive the image data outputted from the image sensor, and guide an access to the specific target.

An image processing device according to another aspect of the present invention includes an image sensor configured to convert an object into image data, a memory configured to store an inference model generated by setting, as a population, a series of plural images obtained time-sequentially when a specific target is photographed, and receiving difference data of the time-sequentially obtained images, and an inference engine configured to use the inference model stored in the memory, receive difference data of the image data outputted from the image sensor and perform inference.

A learning method according to an aspect of the present invention includes setting, as a population, a series of plural images obtained time-sequentially when a specific target is photographed, and generating an inference model by using, as teacher data, sequential images selected from the set population based on whether the specific target can be accessed.

A recording medium according to an aspect of the present invention records a learning program generated by setting, as a population, a series of plural images obtained time-sequentially when a specific target is photographed, and generating an inference model by using, as teacher data, sequential images selected from the set population based on whether the specific target can be accessed.

A display control method according to an aspect of the present invention includes storing an inference model generated by setting, as a population, a series of plural images obtained time-sequentially when a specific target is photographed and using, as teacher data, sequential images selected from the set population based on whether the specific target can be accessed, converting an object into image data, and displaying an inference result by the stored inference model on a display section when the object is converted into the image data.

A method of manufacturing an inference model according to an aspect of the present invention includes a setting step of setting, as a population, a series of plural images obtained time-sequentially when a specific target is photographed, and a generating step of generating an inference model by using, as teacher data, sequential images selected from the set population based on whether the specific target can be accessed.

A method of manufacturing an inference model according to another aspect of the present invention includes a setting step of setting, as a population, a series of plural images obtained time-sequentially when a specific target is photographed, and a generating step of receiving difference data of the time-sequentially obtained images and generating an inference model.

An image pickup apparatus according to another aspect of the present invention includes an image sensor configured to sequentially pick up an image frame, and a processor, wherein the processor compares the picked-up image frame with image frame change information of a model.

A recording medium according to another aspect of the present invention records a learning program generated by setting, as a population, a series of plural images obtained time-sequentially when a specific target is photographed, and generating an inference model by using as teacher data a time-sequential image group including evaluation information on screen transition in the set population.

BRIEF DESCRIPTION OF THE DRAWINGS

FIG. 12 is a diagram showing change of an image when an industrial endoscope is inserted into an inspection target in the image pickup system according to the first embodiment of the present invention;

DETAILED DESCRIPTION OF THE PREFERRED EMBODIMENT(S)

Examples in which the present invention is applied to an image pickup system having a camera (image pickup apparatus) and external equipment will be hereinafter described as preferred embodiments of the present invention. An outline of the image pickup system is as follows. The camera can be connected to the external equipment through a network. Images are accumulated in the external equipment, and information as to whether an accumulated image is obtained by photographing when a target object is captured, whether an accumulated image is obtained by photographing when a target object cannot be captured, etc. is accumulated in the external equipment. A learning section of the external equipment generates an inference model for determining an object by using the images and the information. The learning section analyzes an image group, and generates an inference model serving as a photographing guide until a target object has been photographed. Therefore, even when a user does not know a target object, the camera recognizes the target object, and can output and display a photographing guide configured to cause the object to be photographed.

Note that the user is not necessarily a human, but may be an entity which is deformed or moved at least in part like a robot or a cyborg configured to perform photographing. In this case, information for deformation and movement serves as a guide. Information is assumed to be treated as a guide when the information is effective information which can be inputted to a control section configured to control a driver configured to move an actuator or a control section configure to sense movement of the actuator to control the movement and the position of the actuator.

When an inference model is generated, difference data of a series of image data are generated, and an inference model is generated based on the difference data. The camera can display a photographing guide, etc. by generating difference data of image data or the like and inputting the difference data into an inference engine.

First Embodiment

Figure 1:
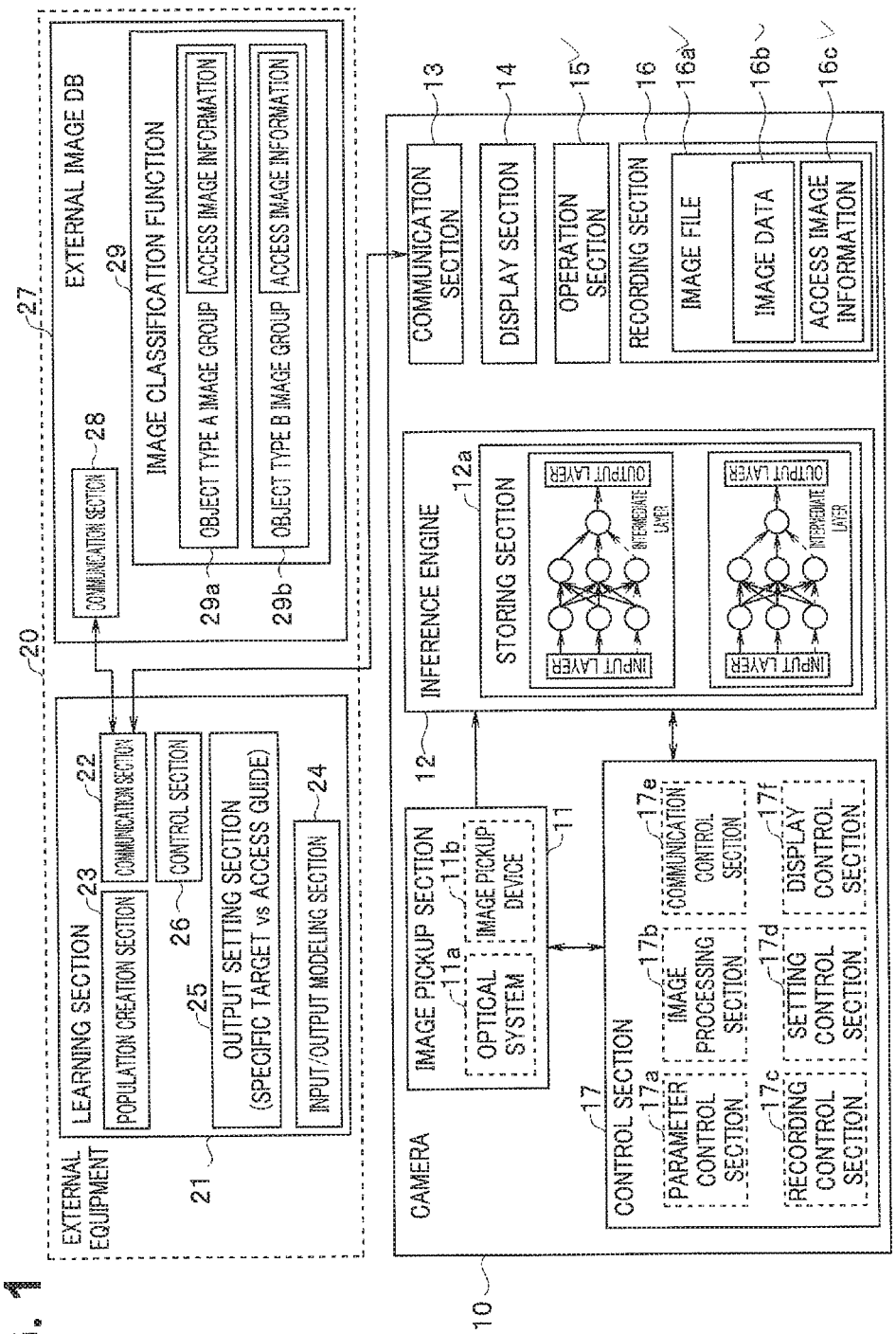
FIG. 1 is a block diagram that mainly shows an electrical configuration of an image pickup system according to a first embodiment of the present invention.

FIG. 1 is a block diagram which mainly shows an electrical configuration of an image pickup system according to a first embodiment. The image pickup system has a camera 10 and external equipment 20.

The camera 10 includes an image pickup section 11, an inference engine 12, a communication section 13, a display section 14, an operation section 15, a recording section 16, and a control section 17. The camera 10 is an image pickup apparatus configured to receive an inference model from the external equipment 20.

The image pickup section 11 includes an optical system 11a and an image pickup device 11b, and also includes an image pickup control circuit, an image data processing circuit, etc. The image pickup section 11 generates image data of an object, and outputs the image data to the control section 17 and the inference engine 12. The image pickup section 11 functions as an image pickup section configured to convert an object to image data.

The inference engine 12 inputs an inference model generated by an input/output modeling section 24 in the external equipment 20 described later, and stores the inference model as an inference model for an image pickup target object A into the storing section 12a. The inference engine 12 uses the inference model stored in the storing section 12a to draw an inference so as to create a photographing advice (advice display and/or camera automatic control) which enables acquisition of a target image with respect to image data obtained by the image pickup section 11. In other words, image data outputted from the image pickup section 11 at a predetermined time interval are inputted to the inference engine 12, and the inference engine 12 uses the image data and the inference model to output a photographing advice such as a target position so that a target image can be obtained. The inference engine 12 may input difference image data between the image data and output a photographing advice based on the difference image data so that a target image can be obtained.

The inference engine 12 has an input layer, an intermediate layer and an output layer, and coupling strength and weighting of neurons among the layers are set according to the inference model stored in the storing section 12a. The inference engine 12 functions as an inference engine configured to input image data and drawing an inference by using the inference model stored in the storing section 12a (see S11 of FIGS. 6 and 8, etc.). The inference engine 12 functions as an inference engine configured to use the inference model stored in the storing section, receive image data outputted from the image pickup section and guide an access to a specific target. The inference engine functions as an inference engine configured to use the inference model stored in the storing section, receive differential data of the image data outputted from the image pickup section and draw an inference.

The storing section 12a is an electrically rewritable non-volatile memory, and stores an inference model generated by the input/output modeling section 24. The storing section 12a stores an inference model for guide display or automatic control when a photographing target is photographed. The storing section 12a functions as a storing section configured to store an inference model generated by the learning device (for example, see S35 of FIGS. 6 and 8). The storing section is capable of storing plural inference models (for example, see S60 of FIG. 10). The storing section 12a functions as a storing section configured to store an inference model generated while setting, as a population, a series of plural images obtained time-sequentially when a specific target is photographed and using, as teacher data, sequential images selected from the population based on whether the specific target can be accessed (for example, see FIGS. 2 and 3). The storing section 12a functions as a storing section configured to store an inference model generated while setting, as a population, a series of plural images obtained time-sequentially when a specific target is photographed and receiving difference data of time-sequentially obtained images (for example, see FIGS. 4 and 5). The time-sequentially obtained images are assumed to be a series of plural images which are traceable and in which each image contains a part of an image just previously obtained. When an image feature captured in a preceding image also appears in a subsequent image, it can be easily traced how an object moves. However, the inference engine is good at detecting features that are difficult to identify with human eyes, and also the inference engine is good at predicting the relationship between preceding and subsequent images even when no overlap exists between images.

The communication section 13 has a communication circuit (containing a transmission circuit and a reception circuit), and performed wired communication or wireless communication with a communication section 22 in the external equipment 20 via the Internet or the like. The communication section 13 receives an inference model generated in the input/output modeling section 24 (for example, see S35 of FIGS. 6 and 8).

Note that when the camera 10 cannot directly access the external equipment 20, the camera 10 may communicate with the external equipment 20 via a portable communication device such as a smartphone. When the camera 10 itself is incorporated in a portable communication device such as a smartphone, the camera 10 may communicate with the external equipment 20 via the portable communication device.

The display section 14 has a display panel, etc., and displays a through image (which is also called "live view image") or the like based on image data obtained by the image pickup section 11. The display section 14 displays an inference result in the inference engine 12. Photographing guides configured to photograph a target may be displayed as an inference result as shown in FIGS. 13A to 13E (see S11 of FIG. 6). The display section 14 functions as a display section configured to display an inference result of the inference engine (for example, see S11 of FIGS. 6 and 8, FIGS. 13A to 13E).

The operation section 15 has various operation members such as a power switch, a release button, a moving picture button, a mode setting dial, a cross button, and an OK button, and detects operation states of the operation members and outputs the operation states to the control section 17. The operation section 15 may have a touch panel configured to detect a touch operation to be executed on a display surface of the display section 14. Furthermore, the operation section 15 allows text input. A learning request set by the operation section 15 is transmitted to the learning section 21, and the learning section 21 performs learning (see S4 of FIG. 8).

The recording section 16 has an electrically rewritable non-volatile memory and records image data. Since the image processing section 17b subjects image processing for recording to image data obtained by the image pickup section 11, the image data which has been subjected to the image processing are recorded in the non-volatile memory.

The recording section 16 is provided with an image file 16a as a region for recording image data. A region for recording image data 16b of a normal recording image and a region for recording access image information 16c are provided in the image file 16a. The access image information 16c is images and other information accumulated until a user acquires a target image.

The control section 17 is a control processor, and includes CPU (central processing unit), peripheral circuits, a memory, etc., and CPU controls respective sections in the camera 10 according to programs stored in the memory. The control section 17 includes a parameter control section 17a, an image processing section 17b, a recording control section 17c, a setting control section 17d, a communication control section 17e and a display control section 17f.

The parameter control section 17a controls various parameters in the camera 10. The parameters include, for example, an exposure control parameter (aperture value, shutter speed value, ISO sensitivity, etc.), a focal length (zooming) adjusting parameter, a focus position (focal position) adjusting parameter, etc. The parameters are not limited to parameters for controlling photographing, but may be parameters for image processing such as art filters.

The image processing section 17b has an image processing circuit, and performs image processing for display of through images, image processing for recording, image processing for reproduction of recording images, etc. The recording control section 17c has a recording control circuit, and performs recording control for recording data such as image data into the recording section 16.

The setting control section 17d controls setting of a learning request matter (request) for performing learning in the learning section 21.

The communication control section 17e has a communication control circuit, and performs communication control when the communication section 13 communicates with the learning section 21.

The display control section 17f has a display control circuit, and performs display control in the display section 14. The display control section 17f controls display of a through image on the display section 14 based on image data acquired by the image pickup section 11, and also controls display of a photographing advice inferred by the inference engine 12.

The external equipment 20 includes a learning section 21 and an external image data base (DB) 27. The learning section 21 and the external image data DB 27 may be arranged in the same equipment, and may not be arranged in the same equipment. The learning section 21 and the external image DB 27 may be linked to cooperate with each other through communication. Plural external image DBs 27 may be provided. The learning section 21 may access image data in the plural external image DBs via the communication section 22 and the communication section 28 to acquire information on the image data. The external equipment 20 may be arranged in a server, and connected to the camera 10 via the Internet.

The learning section 21 includes the communication section 22, a population creation section 23, the input/output modeling section 24, an output setting section 25 and a control section 26.

The communication section 22 has a communication circuit (having a reception circuit and/or a transmission circuit), and transmits/receives data to/from the communication section 28 of the external image DB 27. The communication section 22 also transmits and receives data to and from the communication section 13 of the camera 10.

The population creation section 23 creates a population of image data for performing deep learning. All image data may be used as an optimal population as they are. However, if the population is too large, it takes time to perform processing. In addition, if the population is too large, overlearning may occur and thus reliability may be degraded. Therefore, it is preferable that a population having a proper size is extracted from all image data by using information transmitted as attendant information of the image data.

The population creation section 23 functions as a population creation section configured to set, as a population, a series of plural images obtained when photographing a specific target. Each of the plural images is associated with date and time information and/or position information. In addition, the series of images is obtained time-sequentially (for example, see FIG. 5).

The input/output modeling section 24 has a machine learning processor, performs deep learning by using so-called artificial intelligence (AI), and generates an inference model. More specifically, the input/output modeling section 24 generates a general-purpose inference model or an individual inference model by means of deep learning using the population of the image data created by the population creation section 23. The input/output modeling section 24 has a configuration similar to the configuration of the inference engine 12. The image data created in the population creation section 23 are inputted to the input layer. Also, an evaluation result of an image, for example, teacher data (answer) is provided to the output layer. An inference model is generated by calculating the coupling strength (weighting) of respective neurons so that the input and the output coincide with each other. Note that in the present embodiment, the input/output modeling section 24 generates an inference model by deep learning, but the present invention is not limited to deep learning, and may adopt machine learning.

Figure 2:
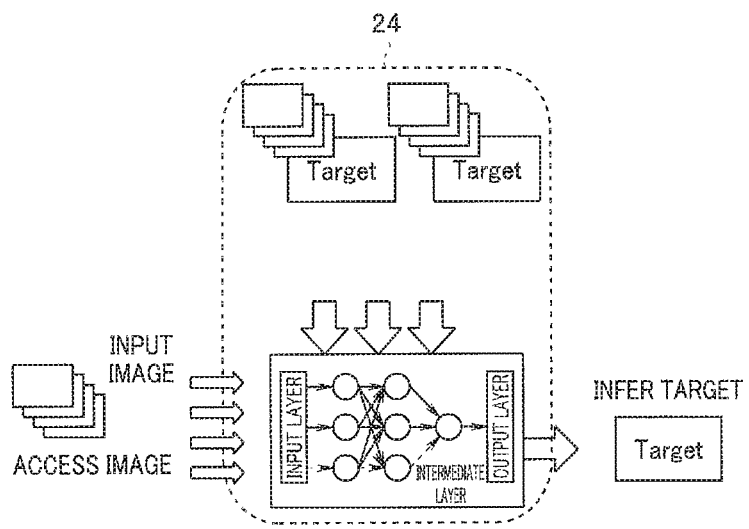
FIG. 2 is a diagram describing a first inference model in the image pickup system according to the first embodiment of the present invention.
Figure 3:
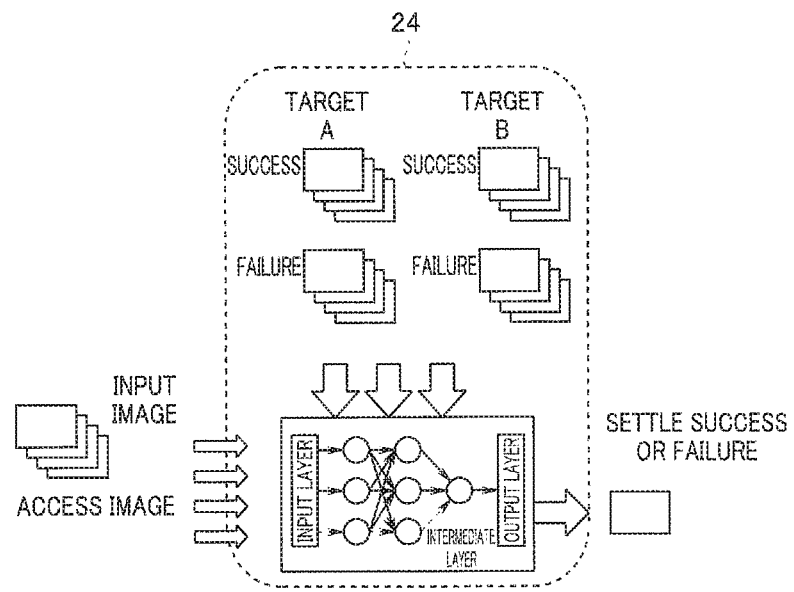
FIG. 3 is a diagram describing a second inference model in the image pickup system according to the first embodiment of the present invention.
Figure 5:
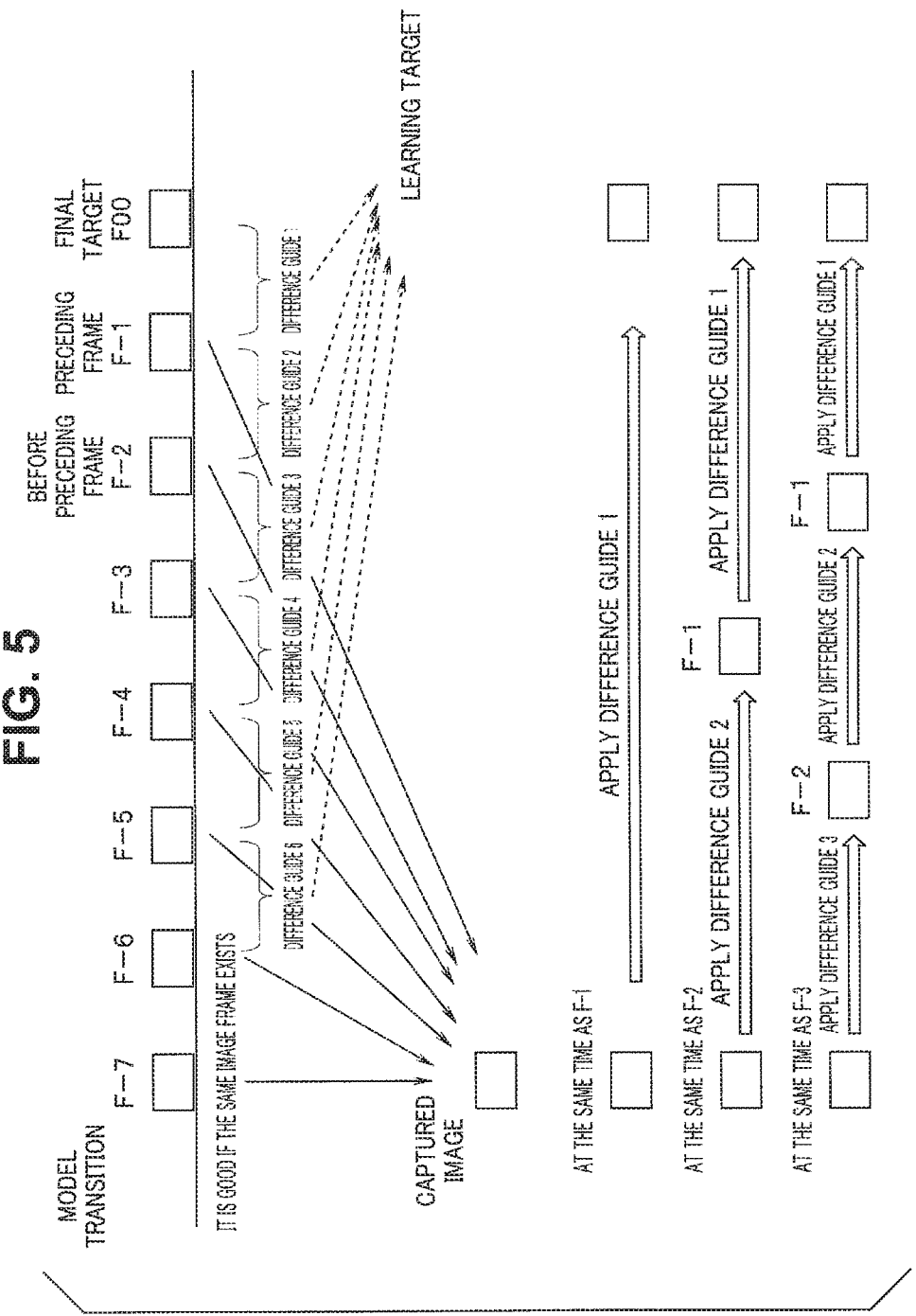
FIG. 5 is a diagram showing the relationship between an acquired image and a guide output (display) in the image pickup system according to the first embodiment of the present invention.
Figure 6:
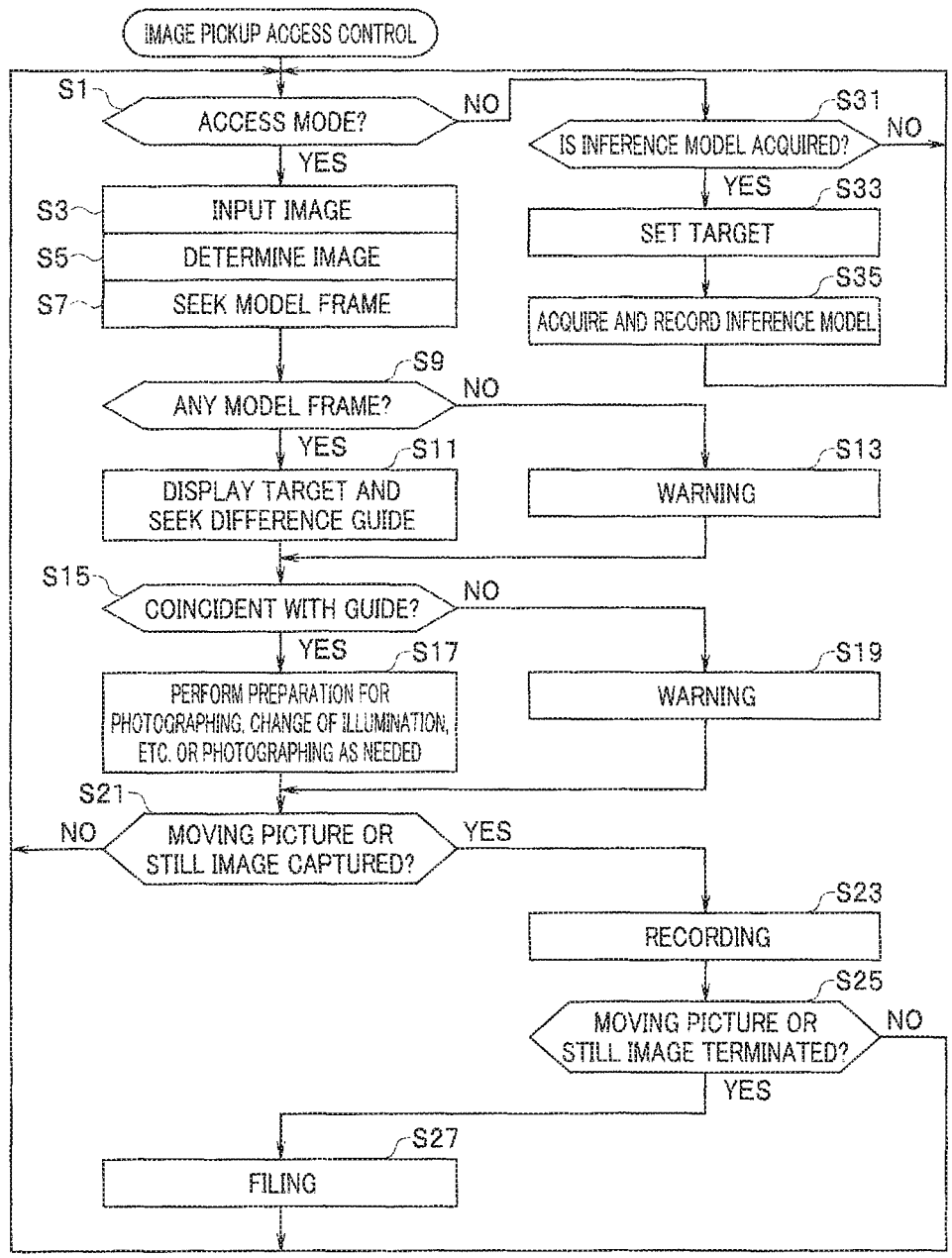
FIG. 6 is a flowchart showing an operation of image pickup access control of the image pickup system according to the first embodiment of the present invention.
Figure 7:
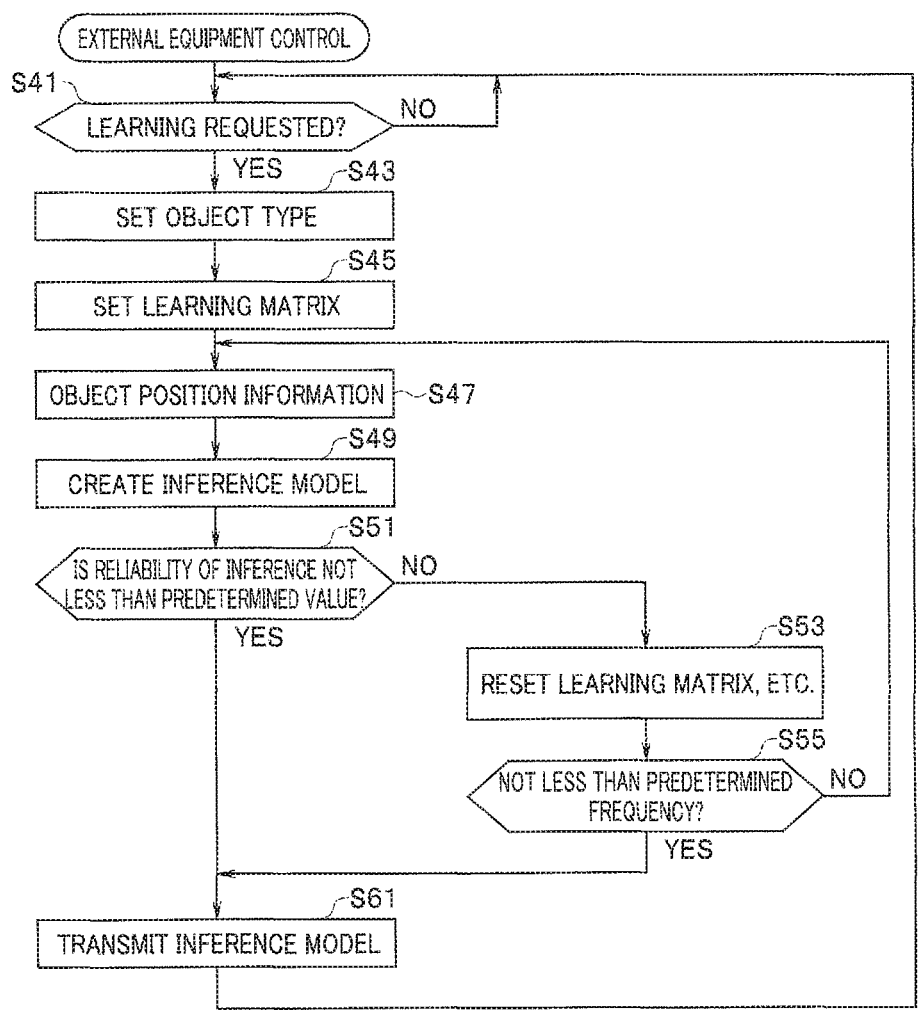
FIG. 7 is a flowchart showing an operation of an external equipment control of the image pickup system according to the first embodiment of the present invention.

The input/output modeling section 24 functions as an inference model generation section configured to generate an inference model by using, as teacher data, sequential images selected from the population set by the population creation section, based on whether a specific target can be accessed (for example, see S49 of FIGS. 2, 3 and 7, etc.). The inference model generation section generates an inference model for determining based on date and time information and/or position information whether a process to the specific target is good or bad (for example, see S49 in FIGS. 2, 3 and 7, etc.). The inference model generation section generates an inference model for outputting a warning display when moving away from the specific target (for example, see S19 in FIG. 6 and FIG. 13E). The inference model generation section receives difference data of time-sequentially obtained images to generate an inference model (for example, see FIGS. 4 and 5). The inference model generation section receives plural images to generate an inference model for estimating a specific target (for example, see FIG. 2). The inference model generation section receives plural images to generate an inference model for making an inference as to whether photographing of a specific target succeeds or fails (for example, see FIG. 3). The input/output modeling section 24 functions as an inference model generation section that receives difference data of time-sequentially obtained images to generate an inference model (for example, see FIGS. 4 and 5).

The output setting section 25 outputs an access guide for a specific target. The output setting section 25 uses the inference model generated by the input/output modeling section 24 to set a photographing advice and/or photographing parameters to be used when drawing an inference. The inference engine 12 of the camera 10 receives image data acquired by the image pickup section 11, and outputs a photographing advice so that a target image (specific target) can be acquired based on the image data and the inference model. The output setting section 25 generates and sets the photographing advice to be used at this time.

The control section 26 is a control processor, and includes CPU (central processing unit), peripheral circuits, a memory, and the like, and the CPU controls each section in the learning section 21 according to a program stored in the memory.

Note that all or some of the peripheral circuits of the CPU in the control sections 17 and 26 may be realized by the CPU (central processing unit) and programs, may be realized by a circuit executed by a program such as DSP (digital signal processor), may be hardware configurations such as a gate circuit generated based on a program language described by Verilog, etc., or may be executed by a hardware circuit. A part of the function of the CPU may be realized by a circuit executed by a program such as a DSP, may be a hardware configuration such as a gate circuit generated based on the program language described by Verilog, or may be realized by a hardware circuit.

The external image DB 27 includes a communication section 28 and an image classification section 29. The communication section 28 includes a communication circuit, and transmits and receives data to and from the communication section 22 of the learning section 21.

The image classification section 29 performs image classification on image data accumulated in the external image DB 27 or accumulated in an image DB outside the external image DB 27. In other words, the image classification section 29 classifies the image data for each photographing object, and records the classified image data in a database for each classified image. FIG. 1 shows that two types of image groups of an object type A image group 29a and an object type B image group 29b are recorded. However, the image groups are not limited to two image groups, and the image classification section 29 may classify the image data into image groups of three or more image groups and record the classified image data for each image group.

Each of the object type A image group 29a and the object type B image group 29b has access image information. With respect to the access image information, the image data accumulated until reaching a target position of a target (specific target) is recorded.

Next, creation of an inference model in the input/output modeling section 24 will be described with reference to FIGS. 2 to 4. FIG. 2 shows the generation of an inference model for inferring what is targeted by a user (a photographing object, an object, a specific target). An input of the input/output modeling section 24 is an access image (input image) created by the population creation section 23. The inference model is a data set for specifying a target (a photographing object, an object, a specific target). The data set indicates the coupling strength among neurons in the intermediate layer of the inference engine.

A population used when the input/output modeling section 24 generates an inference model is image data recorded in the external image DB 27. When an inference model is generated, the population is a series of image groups provided with access time information (and/or position information). By tracing the images based on the access time information and/or the position information, what is a photographing object (specific target) of a photographer can be known.

Since it takes much time for the input/output modeling section 24 to generate an inference model by using all image data recorded in the external image DB 27, an appropriate image group is selected from categories classified for learning. For the image group (the object type A image group or the like), access image information is recorded in association with images. Therefore, the images can be traced based on the access time information. The inference engine 12 provided in the camera 10 can infer what is a user's target (a photographing object, an object, a specific target) and output an inference result when the inference model (data set) generated by the input/output modeling section 24 is inputted to the intermediate layer and an image is inputted to the input layer. For example, in examples shown in FIGS. 13A to 13E, a user visits Nikko, and is about to take a photograph by a camera. The image pickup section 11 of the camera 10 outputs image data for a through image at every predetermined frame time, and the image data is inputted to the input layer of the inference engine 12. When the image data (access image) is inputted, the inference engine 12 infers what is a user's photographing object (specific target). In the example shown in FIG. 13A, an image of "Sacred Stable" where the "Three Wise Monkeys" can be seen is inputted. In the case where an image of "Sacred Stable" exists in image data used when the inference model is generated by the input/output modeling section 24 of the learning section 21, the inference engine 12 infers that the "Three Wise Monkeys" is the user's photographing object (specific target) because the "Three Wise Monkeys" is set as a photographing object (specific target) in many cases. As described above, the inference model used in the inference engine 12 infers what is the user's photographing object (specific target) for various images.

Next, FIG. 3 shows generation of an inference model for drawing an inference for execution of the photographing advice. An input of the input/output modeling section 24 is also an access image (input image) created by the population creation section 23. The inference model is a data set in which success or failure of photographing of a target (a photographing object, an object, a specific target) is known.

The data set indicates the coupling strength among respective neurons in the intermediate layer of the inference engine.

The inference model created by the input/output modeling section 24 infers a photographing guide for photographing various photographing objects (specific targets). The population creation section 23 uses the image data recorded in the external image DB 27 to create a population to be used by the input/output modeling section 24. When the inference model is generated, access time information is given, and a series of image groups provided with information as to whether photographing was excellently performed (successful) or badly performed (failure (not successful)) is used. The input/output modeling section 24 performs deep learning for photographing guides by using the image data of the success and failure cases, and generates inference models.

Note that with respect to image data used by the input/output modeling section 24 to generate an inference model, an appropriate image group is selected from the categories classified for learning as in the case of the image data for learning to infer a photographing object (specific target).

When an access image is inputted, the inference engine 12 infers a photographing guide for photographing the specified photographing object (specific target) with the inference model generated by the input/output modeling section 24, and outputs an inference result.

Figure 13A:
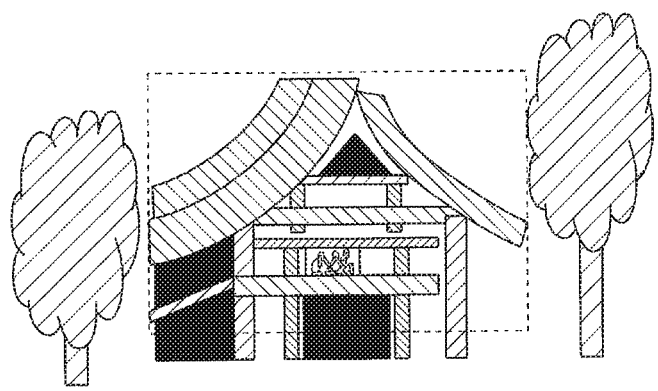
FIGS. 13A to 13E are diagrams showing change of an image when an object is photographed by a camera in the image pickup system according to the first embodiment of the present invention.
Figure 13B:
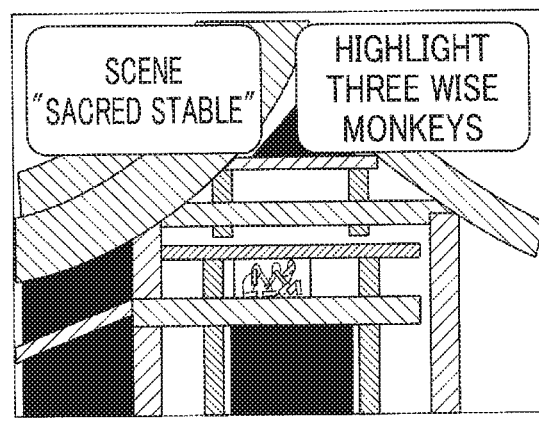

For example, in the example shown in FIG. 13B, when the user trains the camera on "Sacred Stable", it is displayed that the photographing scene is "Sacred Stable" and a highlight in the "Sacred Stable" is the "Three Wise Monkeys". As described above, the image pickup section 11 of the camera 10 outputs the image data for through images at every predetermined frame time period, and the series of image data is also inputted to the inference engine 12. The inference engine 12 displays a photographing guide for photographing the "Three Wise Monkeys" because the photographing object (specific target) is "Sacred Stable" and the highlight here is the "Three Wise Monkeys".

Figure 13C:
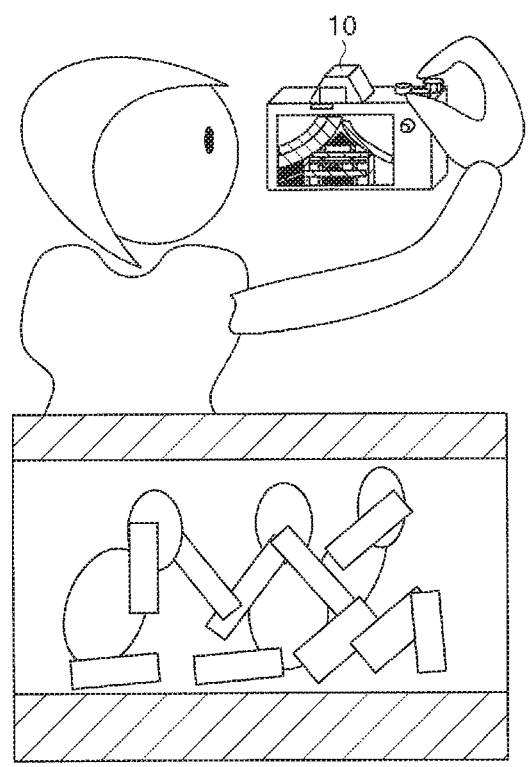
Figure 13D:
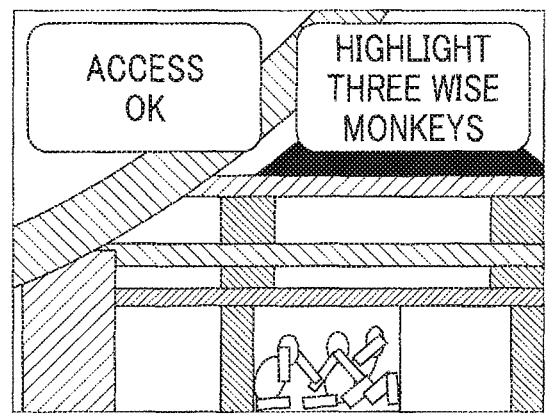
Figure 13E:
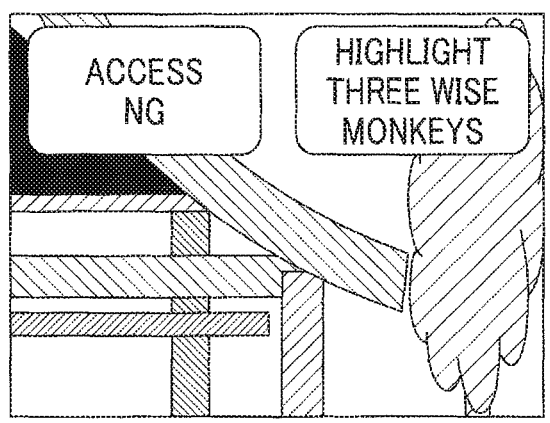

When the user trains the camera on the "Three Wise Monkeys", the inference engine 12 displays photographing guides such as "Access OK", "Highlight Three Wise Monkeys" as show in FIG. 13D. On the other hand, when the user moves the camera away from the Three Wise Monkeys side, photographing guides such as "Access NG", "Highlight Three Wise Monkeys" are displayed as shown in FIG. 13E. In other words, plural targets (two types of targets A and B in the example shown in FIG. 3) are stored in the storing section 12a of the inference engine 12, and an inference for the targets A and B (an inference for "Three Wise Monkeys" in the examples shown in FIGS. 13A to 13E) is selected according to the specific target. Then, the inference engine 12 infers and outputs a photographing guide based on image data from the image pickup section 11 of the camera. When Access OK is displayed as shown in FIG. 13D, the user can take a picture of the Three Wise Monkeys as shown in FIG. 13C by deciding the composition.

Next, generation of an inference model by using a differential image will be described with respect to FIG. 4. Instead of direct use of the image data outputted at a frame interval shown in FIGS. 2 and 3, an inference may be drawn by using difference data of respective image data as shown in FIG. 5. Note that the word "target" is used in FIG. 5, but it is not necessary to strictly have a final target. An idea that it would be no problem if transition of an intermediate image is appropriate by merely making the teacher data a natural panning image may also be accepted, and the intermediate image can be considered to be one of targets. Accordingly, the present invention is also applicable even when not only an image stopping at a target, but also images leading to or passing by the target are picked up. When the user ignores a guide of "return" which is outputted due to passing and moves the camera, it is devisable to output an alternative guide in place of the former guide. An image acquisition process before a final target is captured is also an important point covered by the present application.

Figure 4:
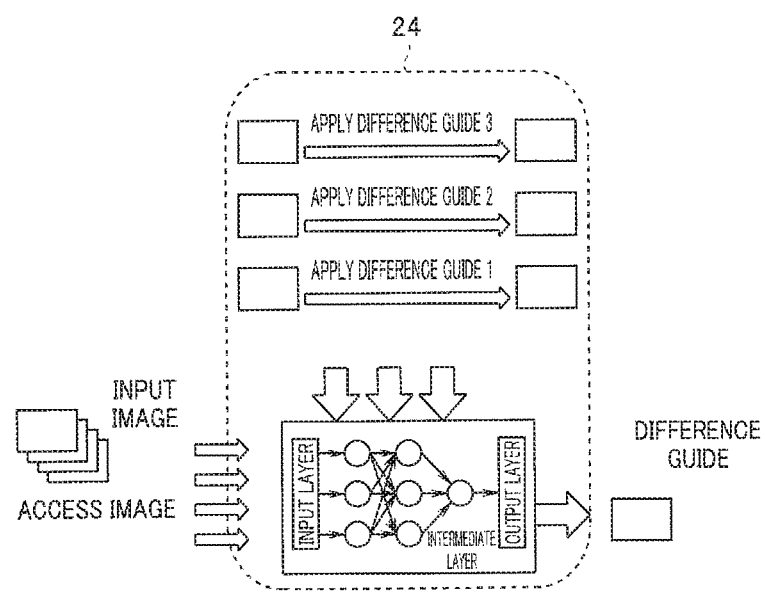
FIG. 4 is a diagram describing a third inference model in the image pickup system according to the first embodiment of the present invention.

FIG. 4 is a conceptual diagram showing how to learn when an inference model is acquired as in a case described later with reference to FIG. 15, but hereinafter particularly shows the input/output modeling section 24 configured to generate an inference model for estimating a photographing object (specific target) described with reference to FIG. 2, and an inference model for performing a photographing advice described with reference to FIG. 3. An input of the input/output modeling section 24 is difference image data of an image group of the population created by the population creation section 23. The word "difference" is a high-level conceptual expression that includes not only simple meaning of "the difference" between images, but also plural images and image groups the differences of which are known, and simply "difference" may include something like moving pictures acquired for a specific time period.

A case where a process of accessing an observation site is photographed as shown in FIG. 12 is considered as a simplest example using the difference. Deep learning is performed while an event where an image of an observation target was captured under photographing, that is, "well-performed image" (for example, an image under observation by an expert) is set as teacher data and an event where an image of an observation target could not be captured under photographing, that is, "not well-performed image" (for example, an image of an observation process which an expert intentionally failed or an image obtained by recording an operation by a beginner) is set as teacher data (negative samples or second teacher data). By using a result of the deep learning, it is possible to infer a guide such as "well-performed" or "not well-performed" for a new image group. This is because when the process of accessing the observation site is well performed, the movement is often close to change of an observation-success image by the expert, and thus an inference can be drawn based on the change of the image.

As shown in FIGS. 13A to 13E, in some cases, an object is to perform photographing that expresses a clear image transition and it is desired to obtain a learning model suitable for a guide for the object. In this case, images of a similar scene uploaded on a network may be set as teacher data, and an image having a large number of accesses may be set as teacher data in association with information of "well-performed". When a similar scene having a small number of accesses exists, the scene may be set as a negative sample (second teacher data). When deep learning is performed with well-performed images and not-well-performed images being set as teacher data, a learning model (inference model) that can perform a guide for both "well-performed" and "not well-performed" can be generated. By receiving a guide with the learning model and performing photographing, it is possible to take a picture close to a picture having a large number of accesses.

With respect to images to be used as teacher data, such a device that the value of "access count" of "image having a large number of accesses" is set to a specific value or more may be performed, or the images may be limited to images taken by famous photographers, images taken by teachers or the like. Examples which have been positively evaluated may be collected by referring to specific comments, writings, etc., and set as teacher data. By utilizing the viewer's evaluation as described above, it is possible to collect, as teacher data, highly evaluated image transition (which may be cooperated with a system configured to quantize and evaluate a useless movement, or a not-too-fast, not-too-slow, not-hesitating and smooth movement, etc.) while referring to the evaluations of the image transition, and perform learning. In other words, it is possible to provide an image pickup apparatus and an image pickup method using a learned model generated by generating an inference model while a series of plural images which have been time-sequentially obtained when a specific target is photographed is set as a population, and a series of images (moving pictures, sequentially captured images, etc.) having information which may provide an impressive screen transition on the population is set as teacher data (a part having an effect such as panning of a part of one moving picture work is called a time-sequential image group). By collecting some time-sequential image groups and performing learning, it is possible to acquire inference models corresponding to various scenes.

Furthermore, even when images to be used under learning are not sequential images in which the time interval between frames is short, the images may be sequential images in which the time interval between frames is relatively long like time-lapse moving pictures or a link of short movies. For example, report images and interview images include images having a well-organized four-part story and images having a badly organized four-part story, and also images with which an appreciator feels comfortable and images with which the appreciator does not feel comfortable. By performing learning with these images, the learning can lead to a law for comfortable images. A way to approach an object and a way to access an object as well as movements in panning photographing and tilt and shift photographing are known as determination materials as to whether an image is an image having a good time transition or not. In addition to the determination materials, movement of focus and movement of zoom, change of exposure, transition of color expression, etc. are known. In the present embodiment, by preparing teacher data in conformity with a purpose of photographing or observation, it is possible to output a corresponding guide.

In other words, the configuration as described above makes it possible to provide an image pickup apparatus capable of performing such an image pickup that transition of the screen is prevented from being too fast or too late or perplexed by comparing frames actually acquired by the image pickup with the panning in which transition of the screen is too fast to cause an unpleasant feeling or transition of the screen is too slow to lose an exhilarating feeling, or image pickup change of moving pictures which serves as a model for providing such an ideal screen transition that a specific target is caused to gradually enter frames. In other words, the image pickup apparatus may be configured to have an image pickup section configured to sequentially acquire an image frame and a comparison section configured to compare acquired frames obtained by the above image pickup with image frame change information of a model. Furthermore, by performing the above comparison based on the inference model, rich information contained in the teacher data can be actively used, and an appropriate guide corresponding to a viewer's preference can be provided even for a scene which is not strictly identical. Since in some cases, the image pickup apparatus has other equipment in place of the display section, the image pickup apparatus may include a display control section capable of displaying the image pickup result described above and the comparison result described above on the display section. The comparison and the inference are not necessarily performed in the image pickup apparatus, and the comparison and the inference may be performed on the display device side.

Only the difference between frames is not necessarily expressed as the difference between image groups. As shown in FIG. 5, learning may be performed on such a micro level as the difference between frames.

Note that it is generally difficult to create an inference model that can perform a guide with the same level of performance under plural situations like examples of FIG. 12 and FIGS. 13A to 13E, etc. Therefore, it may be determined that these situations are different situations, and plural models may be respectively created according to the respective situations. An example shown in FIG. 10 takes generation of plural models in consideration.

The inference model is a data set for specifying a photographing target (specific target) and performing a photographing guide for performing photographing. The data set is a data set indicating the coupling strength between respective neurons in the intermediate layer of the inference engine.

When an access image is inputted, the inference engine 12 specifies a photographing object (specific target) by the inference model shown in FIG. 4, infers a photographing guide for performing photographing, and outputs an inference result. When an inference model for specifying a photographing object (specific target) is set in the intermediate layer of the inference engine 12 and differential image data is inputted, an inference result of the photographing object (specific target) can be obtained from the output side. In addition, when the inference model for the photographing guide is set in the intermediate layer, an inference result of the photographing guide can be obtained from the output side.

For example, in the examples shown in FIGS. 13A to 13E, "slow" or the like is displayed in the case where variation of the differential image data is large when the user moves the camera toward a photographing object. When the moving speed and direction of the camera are appropriate from the differential image data, "leave as it is" or the like is displayed. When it seems from the differential image data that the user passes a highlight, "attention!" or the like is displayed. The inference model performs deep learning so as to perform the photographing guides. Guides can be outputted for the general direction, speed, etc. as described above based on the difference between the current situation and the model. Particularly, with respect to relative ones, the learning can be performed so as to emit a predetermined text or a sound from a determination result regarding the difference.

The learning may be further performed by using negative samples. For example, an example of change of an image (a group of sequential images) in which the movement is excessively faster than a model is learned with information of "too fast", and an example of change of an image (a group of sequential images) when a viewing point and a photographing position are moved in an opposite direction is learned with information of "move in the opposite direction", whereby an inference model for outputting a negative guide can be created. In other words, a series of images in the case where access cannot be correctly performed may be set as second teacher data (negative sample). Of course, by learning an example of change of an image (a group of sequential images) as a model together with information "OK as it is", it is possible to provide a guide that makes the user have peace of mind when it is successful. The guides correspond to the "difference guides" of FIG. 5. In addition, if the inference model also includes data of an image obtained when the user finds a target after being perplexed, it would also be possible to output a guide for recovering the user when the user is perplexed.

In FIG. 4, a difference guide 1, a difference guide 2, and a difference guide 3 correspond to a difference guide shown on a fifth stage of FIG. 5 described later. When an inference model is generated, a series of image groups provided with access time information is used. The input/output modeling section 24 performs deep learning for identification of a photographing object and a photographing guide while the photographing object of the series of image groups and whether a photographing result is successful or unsuccessful are set as teacher data. Although the identification of the photographing object and the photographing guide have been described by using one inference model in the description of FIG. 4, an inference model for the identification of the photographing object and an inference model for the photographing guide may be provided separately from each other.

Next, the inference using difference image data will be described with reference to FIG. 5. A first stage in FIG. 5 shows an example of an image group which is an example of a model for photographing. The image group is a series of image groups acquired by the image pickup section 11 to photograph a final target F00. In the image group, the final target is the image F00, an image just before the final target F00 is a frame image F-1, and an image just before the frame image F-1 is a frame image F-2. Images are acquired at a predetermined frame interval so that an image just before the frame image F-2 is a frame image F-3, and the same is repeated from a frame image F-4 to a frame image F-7. Note that the interval of the images used for inference may be the interval of a frame rate itself for a through image, or may be a predetermined interval suitable for inference which is obtained by appropriately thinning out the frame images.

It is also possible to read out the movement of the model at the time by using only the image. However, the present invention is not limited to the way, and a user's operation may be acquired as information other than the images, and set as a model movement. For example, an acceleration sensor, an orientation sensor, and/or a posture sensor may be provided in the image pickup section to determine on a time basis what kind of operation the user has performed. When operation devices of the camera, etc. perform electric control, the operation statuses of a switch, a dial, a lever, etc. may be determined on a time basis. In other words, what kind of image change has been performed by what kind of operation may be set to be recordable in association with each other.

Various operation information can be acquired based on only the information of these sequential images. In other words, since the image is changed by performing various operations, it is possible to acquire information corresponding to an operation by determining the change of an individual image. The interval between one frame and another is often too little in change, and an image contains noise components caused by an involuntary movement or operation, camera shake or the like. Therefore, the change of an image can be determined and analyzed as information of the operation by comparing images across many frames. The method may be used as needed.

Considering that a reason for occurrence of a difference among images is a result based on an operation, the same operation may be guided to make the same difference. For example, it is considered to perform such a simple guide that when an object is viewed just at the right end, "look at the right more" or "moving direction is opposite" for movement to the left is evenly displayed or the like. However, when a human is operating, the human may not perceive a momentary change. By learning the relationship between such a movement and a guide and performing an optimum guide display, human error can be prevented. When the situation changes every moment and a battery, a memory capacity or the like is wasted, a guide that can perform a rapid operation is preferable.

It has been described that an operation is inferred from change of an image, and the point will be described in more detail. When the image pickup section moves and thus an image pickup range changes during acquisition of images sequential along time, an acquired image also changes. Needless to say, the acquired image corresponds to the movement of the image pickup section. When the frame rate is high as compared with the movement of the image pickup section or the movement of the image pickup section is slow as compared with the frame rate, the change of the image is small, and an overlap portion occurs between preceding and subsequent images that are temporally adjacent (may not be necessarily adjacent) to each other. As for the "difference" of an image, a concept that the difference is a portion excluding the overlap portion also exists. However, the differences is not limited to this, a state where a common object image changes in an image can also be expressed as the difference of the image. Since all of the differences correspond to change in information arising from the difference in the positional relationship between an object and the image pickup section, all of the differences are comprehensively expressed here by the word "difference". When the overlap portion moves to the right along time, the image pickup section moves to the left. In addition, when the overlap portion moves to the left, the image pickup section moves to the right.

As described above, each image shows a photographed object and at the same time contains information representing a photographing position. In addition, an object which will be photographed in a subsequent photographing operation is put in the form of a prior notice in a previous (preceding) image. When the image pickup apparatus is moved under a specific situation, change of an image obtained at that time represents a positional change of the photographing apparatus. Even when an object moves, it may be often considered that the background does not move or is regarded as being immovable.

When a specific object is sought while the image pickup section is moved, an approach method which takes the above-described condition into consideration is effective. However, various scenes and various moving manners are presented. The position of the image pickup section described here is one of various position candidates, and the manner of change also varies depending on the situation. However, as described above, a specific law exists in a series of images, and by finding and using the law, it is possible to provide an effective guide display to pick up an image of a target object. In other words, a guide can be provided by comparing changes in images of individual segments, frames of a group of sequential image frames, or a group of time-sequential images. The comparison result is effective as a guide for moving equipment and an apparatus such as the direction and speed of panning for which the degree of overlapping and the degree of change among plural images are determined.

A difference guide 6 is generated from difference image data between the frame image F-6 and the frame image F-5, and a difference guide 5 is generated from difference image data between the frame image F-5 and the frame image F-4. Likewise, difference guides are generated among the frames from F-4 to F00. A second stage of FIG. 5 is a captured image, and is an image corresponding to the position of the final target. Although "captured image" is written on the second stage of FIG. 5, photographing is not necessary, and the user may only observe an image. Therefore, "captured image" may be restated as "target reached image" or "target image".

For example, a third stage of FIG. 5 shows a case where the similarity between the final image (target image) F00 of a model transition image on the first stage of FIG. 5 and the image F-1 just before the final image F00 is high. In this case, by performing the same operation as a user operation performed between the preceding frame (image F-1) and the final image F00 of the model, basically the same final target F00 can be achieved. In other words, in this case, the possibility that the camera reaches at least immediately a point where a target image can be captured is high, and thus the camera should not be moved so much. A guide such as "seek carefully around here", "a little to the right", or "to the interior", which reflect user operations in model transition may be provided. A guide of "do not move anymore" may be provided because an image having a part of a target or all images have been already contained. Model transition images simultaneously include, for example, information representing an operation when the user moves, and information such as a fast operation when the image changes rapidly and a slow operation when the image changes gradually can be determined from images. The determination result serves as a difference guide 1 on the third stage of FIG. 5.

If the image changes at the same speed as the model, it is possible to approach the final target F00 with a movement following an operation when the model is acquired. When the model is a successful model, an approach method similar to the approach method of the model can be adopted by an operation along the guide, and it is possible to reach the target well. The difference guide serves as information related to the operation causing such a change in an image.

It will be shown that the frame image F00 of the final target can be captured by applying the difference guide 1 at the photographing timing of the frame image F-1. In other words, the difference guide 1 is inferred by using the difference image data between the frame image F-2 and the frame image F-1, and the frame image of the final target can be acquired according to the inference result.

The inference of the difference guide may be performed by using an inference model created by using deep learning. The inference model may be generated by setting, as a population, an image group obtained when a specific target is photographed and using, as teacher data, sequential images selected from the created population based on whether the specific target can be accessed. At this time, as shown in FIG. 5, guide information may be learned in association with time transition of the sequential images (the illustrated difference guides 1 to 6 may be indicated while separated from one another or indicated in a lump). In order to configure such a system that "NG" is provided when a result is different from the result of the model, it may be used as a guide whether the difference is good or bad from the difference between images as compared with the model. Alternatively, a guide for displaying or outputting whether a target is near or far may be provided. In the case shown on the third stage of FIG. 5, "a little more" is outputted because the final target is reached a little more from an inference result.

On a fourth stage of FIG. 5, the image has reached a position where it will reach the target by two more frames in the model, and as compared with the case shown on the third stage of FIG. 5, it cannot be said that the image will reach the target immediately, but it is a situation where a guide of "passing through if you are not careful" is provided. In other words, the difference guide 2 serves as a guide corresponding to such a situation, and the guide is changed to the difference guide 1 when the same image as F-1 is successfully captured. Therefore, it is indicated that the frame image F00 of the final target can be captured by applying the difference guide 2 at the photographing timing of the frame image F-2 and further applying the difference guide 1 at the photographing timing of the frame image F-1.

Likewise, on a fifth stage of FIG. 5, the image has reached a position where the image will reach the target by 3 frames in the model. At the beginning (when the difference guide 3 is displayed), the possibility that the target object is contained in the image is lower than the possibility in the case of the third stage in FIG. 5. Therefore, a different guide display may be provided, for example, a guide for promoting mental preparation such as "a little more" may be provided. It is shown that the frame image F00 of the final target can be captured by applying the difference guide 3 at the photographing timing of the frame image F-3, applying the difference guide 2 at the photographing timing of the frame image F-2, and further applying the difference guide 1 at the photographing timing of the frame image F-1.

In the example, in order to facilitate the description, expressions like "preceding frames F-1 and F-2" and "every frame" are given. However, more frames may be provided between the frames. In this case, the frames F-1, F-2, etc. may be set as characteristic representative frames selected from plural frames (selected while reflecting the time-sequence under the operation). Alternatively, F-1, F-2, etc. may be treated as a set of plural frames. Guides for "prompting mental preparation" may be caused to learn while associating the model transition with images and change of the images. A general guide to be carried out when the target gets closer is incorporated in a program, and caused to learn a result in a case where the guide is adopted or a result in a case where the guide is not adopted.

In the present embodiment, the input/output modeling section 24 inputs the difference image data of the frame images F-7 to F-1 before the final target F00 as shown on the first stage of FIG. 5 is photographed, and performs deep learning with the final target F00 as teacher data, thereby generating an inference model capable of inferring photographing guides such as the difference guides 1 to 6. Image data groups serving as models as shown on the first stage of FIG. 5, the number of which is as large as possible, are inputted and learned, whereby an inference model having high accuracy can be created.

Figure 8:
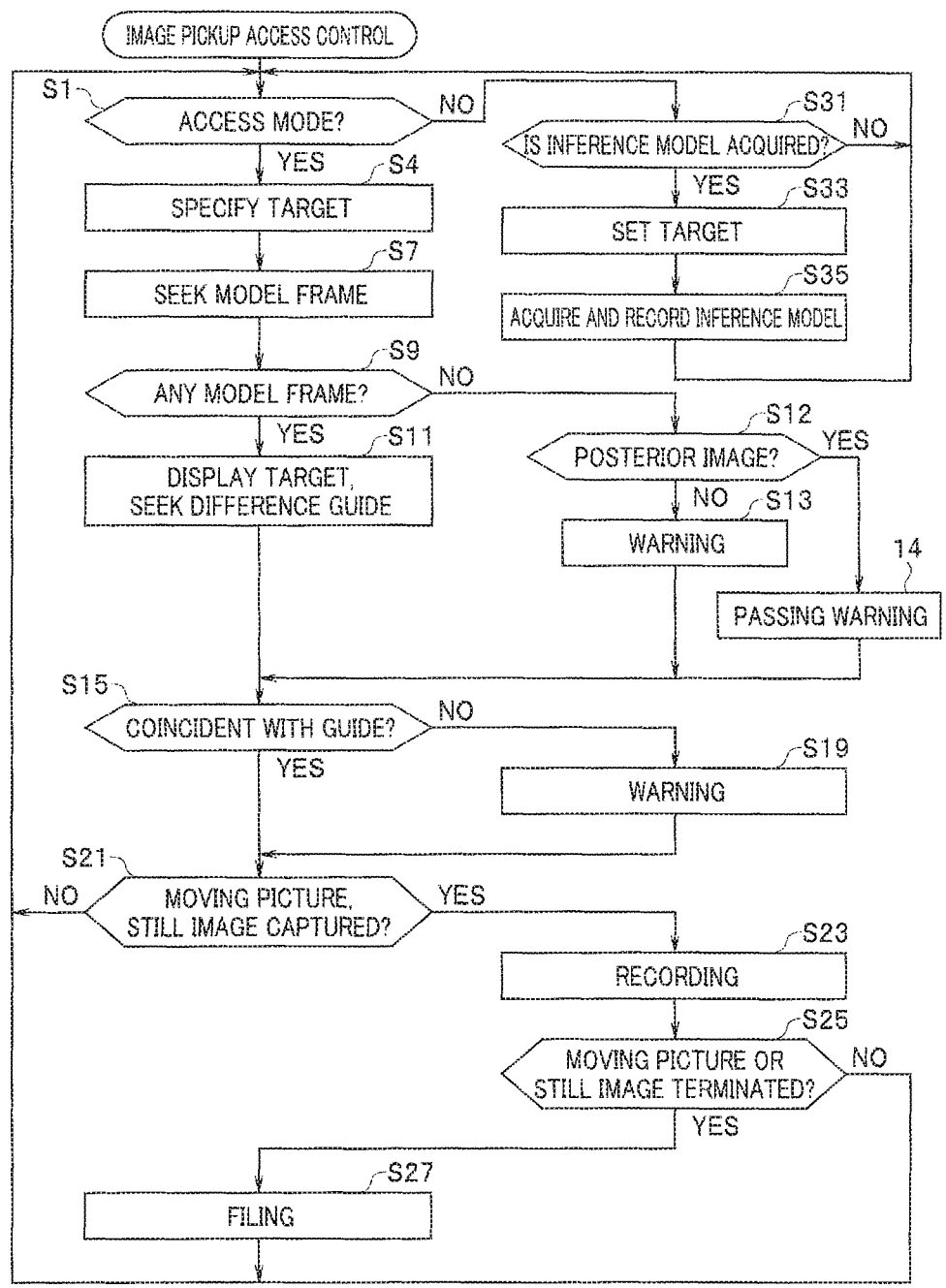
FIG. 8 is a flowchart showing a modification of the operation of the image pickup access control of the image pickup system according to the first embodiment of the present invention.

Next, an operation of image pickup access control in the camera 10 will be described with reference to a flowchart shown in FIG. 6. The flow (the flow in FIG. 8 is the same) is executed according a program stored in the memory by the control section 17 in the camera 10.

When the flow of the image pickup access control starts, first, it is determined whether an access mode is set (S1). When the access mode is set, the camera 10 seeks a photographing target (specific target) and displays a photographing guide for photographing the photographing target.

The access mode may be a default mode, or may be set on a menu screen or the like of the camera 10 by the user.

When the determination result in step S1 indicates the access mode, an image is inputted (S3). Here, a series of image data is inputted from the image pickup section 11 at a time interval corresponding to a frame rate. When the image data are inputted, photographing position information and photographing date and time information are inputted together. When difference data are generated, the pieces of information may also be associated with the difference data. The inputted image data are displayed as a through image on the display section 14, and is inputted to the inference engine 12. Note that the image data inputted to the inference engine 12 may be image data obtained by appropriately thinning out the image data outputted from the image pickup section 11.

When an image is inputted, image determination is then performed (S5). Here, the inference engine 12 uses the inference model to find a scene (photographing object (specific target)). The step corresponds to the determination of a scene "Sacred Stable" in the example of FIGS. 13A to 13E described above.

When the image determination is performed, model frames are then sought (S7). The model frames are images serving as a model when a scene (photographing object) as shown on the first stage of FIG. 5 is photographed. When model frames exist, an inference model corresponding to the model frames has been stored in the storing section 12a in the inference engine 12.

After the model frames are sought, it is next determined whether model frames exist (S9). Here, the determination is performed based on the seeking result in step S7. When the result of the determination indicates that no model frame exists, a warning display is performed (S13). The case corresponds to a case where the photographing object cannot be specified and/or a case where it is impossible to perform a guide display for photographing the photographing object. In this step, a warning is displayed on the display section 14.

When the determination result in step S9 indicates that model frames exist, a target display is performed and a difference guide is sought (S11). Here, since the photographing object (specific target) is inferred by the inference engine 12, the inference engine 12 causes the display section 14 to display what the photographing object (specific target) is. For example, "scene Sacred Stable" may be displayed as shown in FIG. 13B. A guide display as shown in FIGS. 13D and 13E may be performed. Also, the difference guide is sought. It is searched whether an inference model for performing a difference guide suitable for photographing the photographing object (specific target) is stored in the storing section 12a.

After the difference guide is sought in step S11 or after a warning is given in step S13, it is next determined whether a photographing result coincides with a guide (S15). Here, it is determined whether the change of images acquired by the image pickup section 11 coincides with an inference result obtained by the inference engine 12 by using the difference guide sought in step S11. For example, when the difference image data changes like the model image as shown on the first stage of FIG. 5, it is determined that the photographing result coincides with the guide. Note that when no difference guide is sought in step S11, it is not determined that the photographing result coincides with the guide.

When the determination result in step S15 indicates that the photographing result does not coincide with the guide, a warning is displayed (S19). When the difference guide sought in step S11 has been sought, an inference is drawn by using the difference guide. When the inference result does not coincide with the difference data of the image data actually acquired by the image pickup section 11, a warning is issued.

On the other hand, when the determination result in step S15 indicates that the photographing result coincides with the guide, preparation for photographing, change of illumination and the like are performed as necessary, and photographing is performed (S17). When the difference image data changes as the guide indicates, preparation for photographing is performed because the possibility that the photographing object as a target can be photographed is high. In the preparation for photographing, for example, parameters such as the number of photographing pixels are set. Any one of a shutter speed value, an exposure control value such as an aperture value, a focal length, and a focal position may be set. The change of illumination, etc. includes, for example, preparation for a flash device, the projection angle of a flash device, etc. Single photographing or sequential photographing may be used as the photographing.

After the processing in step S17 or S19 is performed, it is next determined whether a moving picture or a still image is captured (S21). When the user captures an image as a target according to the photographing guide, the user captures a moving picture or a still image. In other words, when a still image is captured, the user operates the release button of the operation section 15. When a moving picture is captured, the user operates the moving picture button of the operation section 15. In the step, determination is made based on whether the release button or the moving picture button has been operated. When the determination result in the step indicates that photographing of a moving picture or a still image is not performed, the processing returns to step S1.

On the other hand, when the determination result in step S21 indicates that a moving picture or a still image is captured, recording is performed (S23). Here, the image processing section 17b performs image processing for moving pictures or still images on the image data acquired by the image pickup section 11, and records the image-processed image data in the recording section 16.

After the image data are recorded, it is next determined whether photographing of the moving picture or the still image is terminated (S25). In the case of moving pictures, the user operates the moving picture button to terminate the photographing. In the case of still images, the photographing automatically terminates when image data for one frame is acquired in the case of single photographing, and the photographing terminates when the user releases the release button or the like in the case of sequential photographing. When the determination result in the step indicates that the photographing has not terminated, the processing returns to step S1.

On the other hand, when the determination result in step S25 indicates that the photographing is terminated, filing is performed (S27). In the case of moving pictures, sequential plural image data are filed. In the case of still images, each frame is individually filed. When the filing has been performed, the filed image data are recorded as an image file 16a in the recording section 16. When the filing has been performed, the processing returns to step S1.

Returning to step S1, when the determination result in the step indicates no access mode, it is next determined whether an inference model is acquired (S31). An inference model used in the inference engine 12 is generated by deep learning in the input/output modeling section 24 in the external equipment 20. In the step, it is determined whether generation of an inference model should be requested to the external equipment 20. The user requests acquisition of the inference model by operating the operation section 15 of the camera 10. When the determination result in the step indicates non-acquisition of an inference model, the processing returns to step S1.

When the determination result in step S31 indicates acquisition of an inference model, an object is set (S33). A method of setting an object may include a method of manually inputting features of the object in the form of a text, or a method of inputting an image indicating the object. When the object is a famous building, scenic spot, sightseeing spot or the like, the appellation of the object may be inputted. When the object has been set, generation of an inference mode for the object is requested to the learning section 21 via the communication section 13 in the camera 10 and the communication section 22 in the external equipment 20 (see S41 in FIG. 7).

After the object is set, an inference model is next acquired and recorded (S35). When the learning section 21 in the external equipment 20 has generated an inference model, the learning section 21 transmits the generated inference model to the camera 10 as a request source (see S61 in FIG. 7). In the step, the inference model transmitted from the external equipment 20 is received, and stored in the storing section 12a. After the inference model is stored, the processing returns to step S1.

As described above, in the flow of the image pickup access control, difference image data of image data acquired by the image pickup section 11 is generated (see S3), and the difference image data is inputted to the inference engine 12. The inference engine 12 uses the inference model to infer a photographing object targeted by the user (see S5), and seeks and displays a difference guide fit for the photographing object (see S7 and S11).

In the present embodiment, the inference is drawn by using a series of time-sequential images, or a group of sequentially and successively obtained images, or difference image data of the images. Therefore, it is possible to make effective use of a rich amount of information possessed by the images, and further increase the amount of information by images acquired repetitively over time, thereby deriving effective information. It is possible to perform the learning having a maximum effect by a method limited to acquisition of images. Needless to say, the learning may be performed while adding information other than image information. When the learning is performed by using only images, processing can be performed with a simple hardware configuration. In addition, when the hardware configuration is simple, it enables active use for devices, apparatuses and systems in various fields. By performing the learning with only images, operations can be simplified, and changes can be quickly dealt with. In particular, a photographing object (specific target) can be identified quickly, and a photographing guide can be displayed by quickly drawing an inference.

Next, a learning operation in the learning section 21 of the external equipment 20 will be described with reference to a flowchart shown in FIG. 7. The flow (as well as flows shown in FIGS. 9 and 10) is executed according to a program stored in the memory by the control section 26 in the external equipment 20.

When the flow of external equipment control starts, it is first determined whether a learning request exists (S41). As described above, the camera 10 requests the learning section 21 to perform learning in step S33 (see FIG. 6). In the step, the determination is made based on whether the learning request has been received from the camera 10 through the communication section 22. When the determination result indicates that no learning request is received, the processing is set to a standby state.

When the determination result in step S41 indicates that a learning request exists, the type of an object is next set (S43). When the camera 10 makes a learning request, the learning request is made with the object being specified (see S33 in FIG. 6), and thus in the step, the type of the object is set in response to the request from the camera 10.

Subsequently, a learning matrix is set (S45). Here, the population creation section 23 sets the range of the population of image data in the external image DB 27 based on the type of the object set in step S43. In the example shown in FIGS. 13A to 13E, an inference model for providing a photographing guide when the Three Wise Monkeys is photographed is generated. In the case, it is preferable that a moving picture representing a photographing process of the Three Wise Monkeys is set as a learning matrix. When deep learning (machine learning) is performed, it is desirable to appropriately set the learning matrix so that learning can be performed efficiently.

After the learning matrix is set, object position information is next set (S47). If object position information exists when learning is performed, the position information of the object is set together. For example, when an inference model for photographing the Three Wise Monkeys in the Sacred Stable is created, the position information of the Sacred Stable (Three Wise Monkeys) is set. Note that the setting of the object position information may be omitted depending on a learning request item.

After the object position information is set, an inference model is next created (S49). Here, the input/output modeling section 24 generates the inference model based on the set object and the like. More specifically, as described above, the input/output modeling section 24 performs learning by using a series of image groups associated with date and time information. In addition, the input/output modeling section 24 generates difference image data when performing learning, inputs the difference image data, and performs deep learning while using, as teacher data, photographing objects (specific targets), success or failure of photographing, photographing guides, etc. Data such as the coupling strength among respective neurons which have been generated by the deep learning is used as an inference model.

When the inference model has been generated, it is determined whether the reliability of the inference is not less than a predetermined value (S51). Here, the reliability of the inference model generated in step S49 is calculated. The determination of the reliability is performed, for example, by calculating a LOSS value or the like. The LOSS value is a difference between an inference result in an inference model generated by deep learning and a previously known answer when the deep learning is performed on a practice question the answer of which is known in advance.

When the determination result in step S51 indicates that the reliability of the inference is less than the predetermined value, a learning matrix is reset (S53). Here, the learning matrix set in step S45 is reset. As a resetting method, a population parameter may be increased or decreased by using the input image, attendant data of images. The teacher data may be changed.

Subsequently, it is determined whether the frequency of resetting the learning matrix is not less than a predetermined frequency (S55). In some cases, the reliability may not reach a predetermined value or more even when the learning matrix is reset. In the step, the determination is made based on the frequency of resetting the learning matrix. When the determination result indicates that the resetting frequency is not equal to the predetermined frequency or more, the processing returns to step S47, an inference model is generated again, and reliability is determined.

When the determination result in step S55 indicates that the resetting frequency is not less than the predetermined frequency, or when the determination result in step S51 indicates that the reliability of inference is not equal to a predetermined value or more, an inference model is transmitted (S61). Here, the inference model generated in step S49 or the inference model generated by resetting the learning matrix in step S53 is transmitted to the camera 10 through the communication section 22 and the communication section 13. After the inference model is transmitted, the processing returns to step S41.

As described above, in the flow of the external equipment control, when a learning request is received from the camera 10 (S41), the type of an object is set, a learning matrix is set according to the type of the object (S45), and an inference model is generated (S49). The reliability of the thus-generated inference model is determined, and when the reliability is low, the learning matrix is reset, and inference is performed again (S53, S49). When the inference model is generated, the input/output modeling section 24 generates difference image data of image data, and performs deep learning by using the difference image data.

Next, a modification of the image pickup access control flow shown in FIG. 6 will be described with reference to a flowchart shown in FIG. 8. In the flow of the image pickup access control according to the first embodiment, the object is determined from the images, but in the modification, it is possible to specify a target by a method which is not limited to images (see S4). In the first embodiment, no warning is given when the photographing direction of the camera has passed the object. However, in the present modification, a warning is given when the photographing direction of the camera has passed the object. The flowchart according to the present modification differs from the flowchart shown in FIG. 6 in that steps S3 and S5 are replaced with step S4 and steps S12 and S14 are added. Therefore, the difference will be mainly described.

When the flow of image pickup access control starts, it is first determined whether the access mode is set (S1). The result of the determination indicates that the access mode is set, a target is specified (S4). In the flow shown in FIG. 6, an image is inputted (S3), and a photographing object (specific target) is recognized by determining the image (S5). In other words, a photographing scene is determined from the image. On the other hand, in the present modification, the photographing object (specific target) is specified regardless of the image. As the indication which is not based on the image, for example, the user may operate the operation section 15 to specify the photographing object in the form of a text. For example, in the example shown in FIGS. 13A to 13E, the "Three Wise Monkeys" may be inputted in the form of a text, and additionally "Nikko" or "Sacred Stable" may be inputted in the form of a text. Even when the user is not conscious of "Three Wise Monkeys", by inputting "Nikko" or "Sacred Stable", it can be inferred by the inference model that "Three Wise Monkeys" is a highlight, and a photographing guide can be performed.

When the target has been specified, a model frame is sought (S7). When a model frame exists (S9: Yes), it is determined whether the model frame is a posterior image (S12). The user may be unaware of a highlight object and thus have passed the highlight object. In the step, the inference engine 12 determines whether the user has passed the highlight object, but will be able to see the highlight object later. When the result of the determination indicates that the model frame is not a posterior image, a warning is displayed to indicate that no model frame exists (S13).

When the determination result in step S12 indicates that the model frame is a posterior image, a having-passed warning is issued (S14). As described above, since the user has already passed the highlight object, a warning display for the fact is performed. Processing similar to the processing in the flowchart of FIG. 6 is also performed in the flowchart of FIG. 8 except for the steps S4, S12, and S14 described above, and thus detailed description will be omitted.

Next, an operation of the external equipment 20 cooperating with the camera which operates in the flow of the image pickup access control shown in FIG. 8 will be described with reference to the flowchart shown in FIG. 9. In the flow of the external equipment control according to the first embodiment (see FIG. 7), the learning matrix is set by extracting the learning matrix from the moving pictures stored in the external DB. On the other hand, in the present modification, not only moving pictures with time information, but also still images with time information can be used. Two types of inference models for sequential photographing (for moving pictures) and still images are generated and transmitted as inference models to be generated (see S49, S61, and S63). The flowchart according to the present modification differs from the flowchart shown in FIG. 7 in that step S45 is replaced with step S45a and step S61 is replaced with steps S63 and S65. Therefore, the difference will be mainly described.

Figure 9:
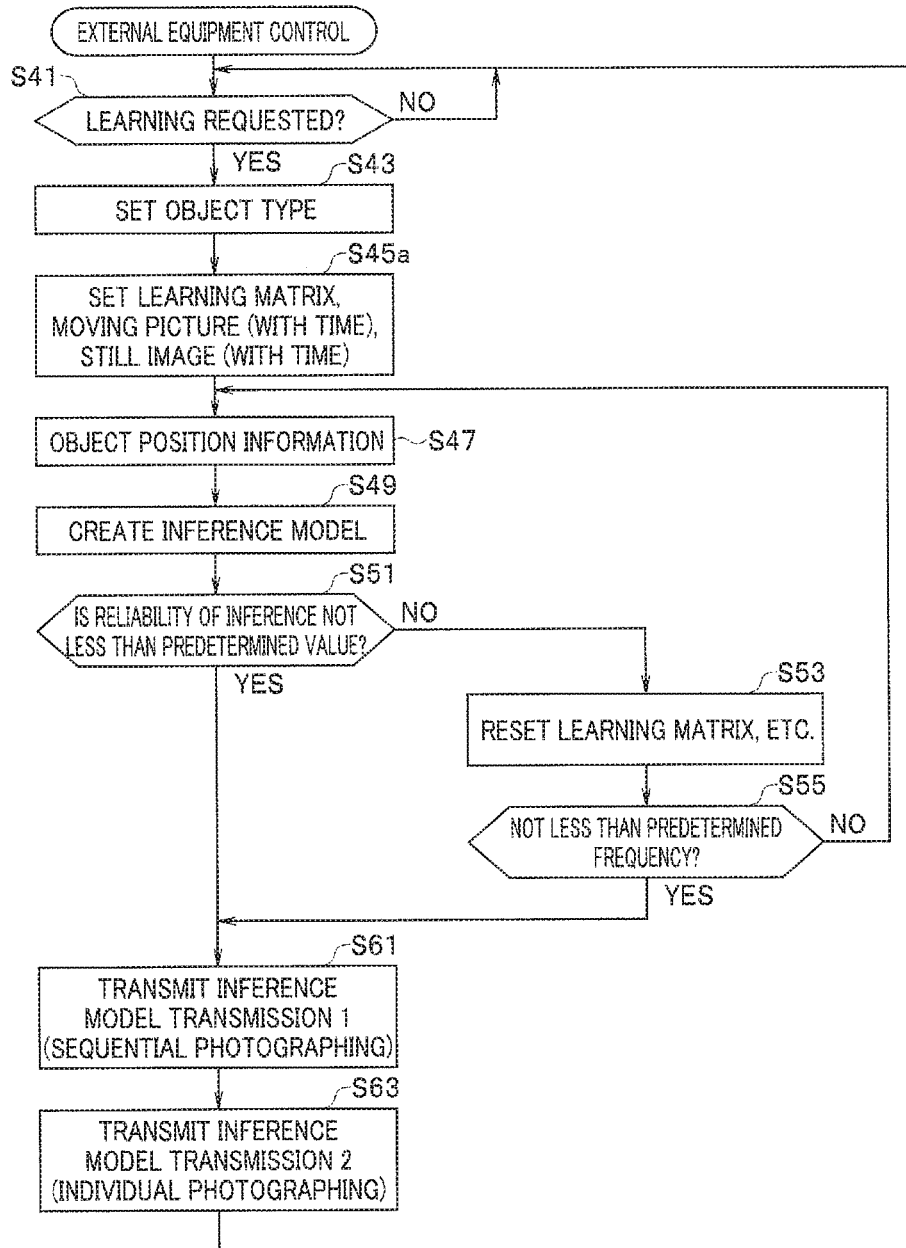
FIG. 9 is a flowchart showing a first modification of the operation of the external equipment control of the image pickup system according to the first embodiment of the present invention.

When the flow of the external equipment control shown in FIG. 9 starts, it is determined that a learning request is made (S41: Yes) and the type of an object is set (S43), a learning matrix is set (S45a). In step S45a, in addition to the moving pictures with date and time information, image data in which the date and time information is associated with the still images are also used as a learning matrix. By using the learning matrix, the images shown in FIG. 5 can be set as time-sequential image information in photographing order or in acquisition order. The image data are configured by plural image groups. A moving picture with time information is sequential images with an object overlapping between frames. In still images with time information, no overlapping object between frames generally exists, and no correlation as images exists. However, even in the case of still images, by arranging the still images time-sequentially, the images provide a linkage of a series of images.

After the learning matrix is set, object position information is next acquired (S47), and an inference model is generated by using the learning matrix set in step S45a (S49). Inference models to be generated here have two types of an inference model 1 (sequential photographing) and an inference model 2 (individual photographing). The inference model 1 is an inference model suitable for a case where an object overlaps between frames and images are sequential. The inference model 2 is an inference model suitable for still image photographing in which images are individually and independently captured. For example, in the case of photographing in "Nikko" as shown in FIGS. 13A to 13E, when still images are captured at each sightseeing spot while moving along a typical route such as "Nikko Station→Three Wise Monkeys→Youmeimon→Nemurineko", the inference model 2 is suitable for the photographing. On the other hand, when a moving picture is captured at each sightseeing spot, the inference model 1 is suitable for the photographing.

In step S51, when the reliability of the inference is not less than a predetermined value, or when the learning matrix is reset and inference is performed by a predetermined number of times or more (S55: Yes), the inference model 1 (sequential photographing) is transmitted (S63). The inference model 1 is an inference model suitable for a case where photographing of plural number of times along time, that is, sequential photographing (including a moving picture) is performed by the camera 10. When sequential photographing is performed, the camera 10 is moved spatially, and photographing is performed while changing an object, so that the sequential photographing is photographing different from the photographing for still images. The inference model is useful when a photographing guide suitable for such sequential photographing is performed.

After the inference model 1 is transmitted, the inference model 2 (individual photographing) is transmitted (S65). The inference model 2 is suitable for photographing for still images, and is useful when a photographing guide suitable for single photographing of a single object is performed. When the inference model 1 and the inference model 2 are transmitted to the camera 10, the processing returns to step S41.

As described above, in the modification of the flow of the external equipment control, inference models which are suitable for the sequential photographing and the single photographing respectively are generated. Therefore, it is possible to perform an optimal photographing guide according to whether the user performs sequential photographing or single photographing.

Next, a second modification of the flowchart of the external equipment control shown in FIGS. 7 and 9 will be described with reference to a flowchart shown in FIG. 10. In the present modification, images in the case of failure are also adopted as second teacher data and learning is performed (see S44 and S49). When learning is performed, plural inference models are generated according to situations (see S49, S60, and S67). The flowchart shows an operation of the external equipment 20 cooperating with the camera which operates in the flow of the image pickup access control shown in FIG. 6 or FIG. 8.

Figure 10:
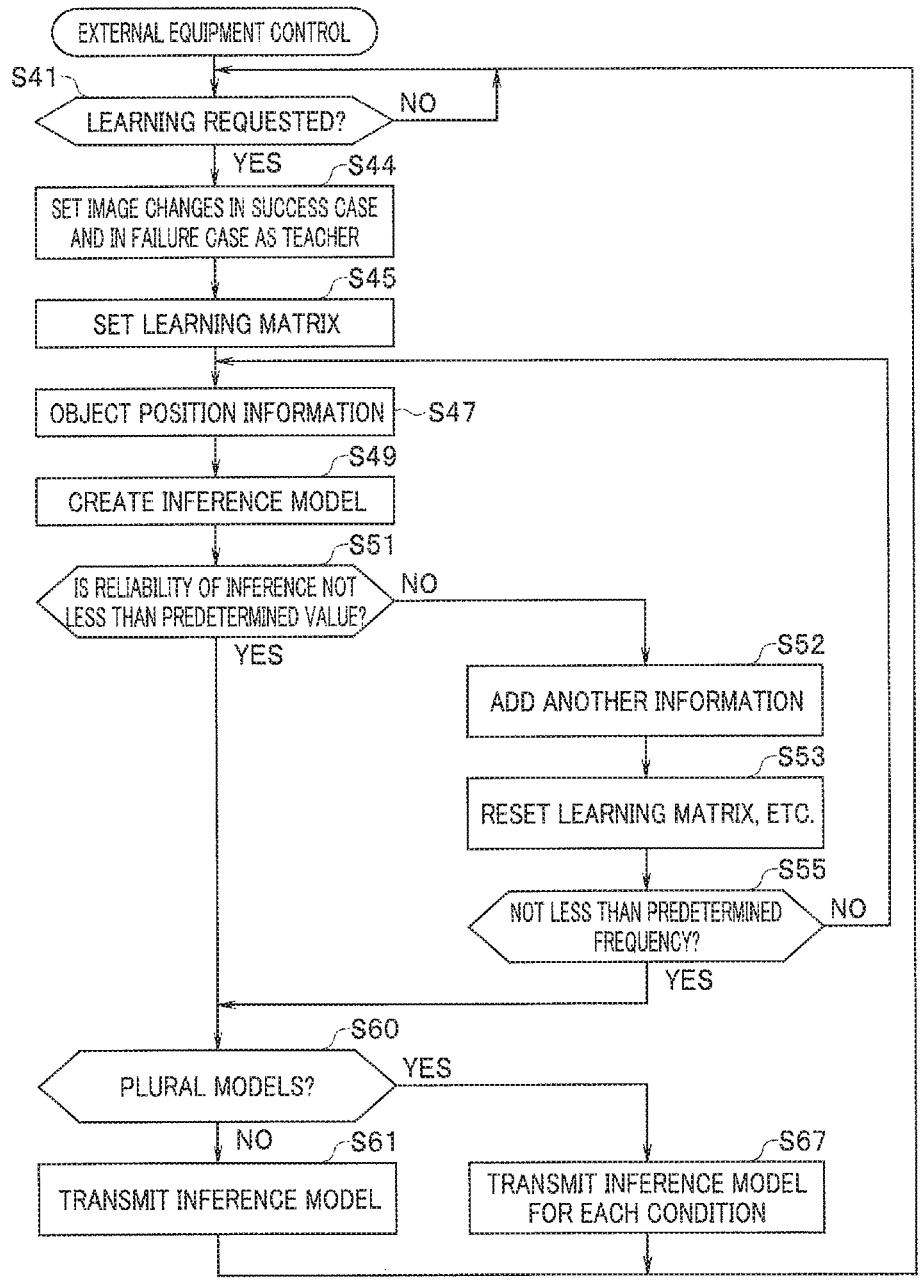
FIG. 10 is a flowchart showing a second modification of the operation of the external equipment control of the image pickup system according to the first embodiment of the present invention.

The flowchart shown in FIG. 10 is different from the flowcharts shown in FIGS. 7 and 9 in that step S43 is replaced with step S44 and steps S52, S60, and S67 are added. Therefore, the difference will be mainly described.

When the flow of the external equipment control shown in FIG. 10 starts and it is determined that a learning request is made (S41: Yes), image changes in a good case and a bad case are set as teacher data (S44). In the second modification, inference is performed while using, as teacher data, both images in the case where a photographing object (specific target) can be photographed successfully and in the case where a photographing object cannot be photographed successfully. In the case of a moving picture, by determining change of a series of images, it is possible to determine whether the photographing has been successfully performed. In the case of still images, by tracing time information and position information associated with the images, it is possible to determine whether photographing has been successfully performed. The teacher data may be determined based on the determination results. Note that irrespective of whether photographing has been successfully performed, learning may be performed while using images of both cases where the user has successfully reached a target object and where the user has not reached the target object.

With respect to teacher data, when the user is coached, coating contents may be used as teacher data. For example, in a case where a golf swing is being photographed by sequential photographing or the like, when the user is instructed in swing by an instructor, the instruction may be used as teacher data.

When the teacher data is determined in step S44, a learning matrix is set as in the case of FIGS. 7 and 9 (S45). The learning matrix may be configured by images obtained in photographing order or images arranged time-sequentially in acquisition order as images conforming to the images shown on the first stage of FIG. 5. In the example of the leading guide to the photographing point as shown in FIGS. 13A to 13E, by determining the date of photographing and adopting new data, learning can be performed with images close to the present situation. In the case of data for which the situation has been changed because the data are old, the data can be used as information for providing a guide for preventing making a mistake as negative samples (second teacher data). For example, a method may be used in which when old data are inputted to an inference model obtained by performing learning with a new image group, but a correct guide cannot be outputted, reliability, etc. of the inference are determined, and old data are used as negative samples.

In the above-mentioned learning matrix, since information on seasons can also be acquired, it is possible to make such a device that the learning is performed in different styles while changing a guide adaptable to a scene where plants grow thickly in summer and a guide adaptable to a snow scene in winter to each other. The learning may be performed according to a season for which a guide is needed. Also, guides may be provided in consideration of a user's condition such as the difference in user's psychological leeway, physical leeway or temporal leeway until sunset between morning and evening. When a guide takes much time, a guide for proposing a user to give up also seems to play a role as a guide.

Such a guide can also be regarded as the difference guide in FIG. 5, and the learning can be performed by associating the guide with the model transition. For example, when an image far from the target like the image F-7 has been obtained, the user can be helped by a guide corresponding to the image even in the case where the content of the guide indicates "recommend to give up". In the case of a guide corresponding to the image F-4, the guide may be a guide containing a question indicating "it will still take 30 minutes, but are you Okay?". A guide corresponding to the image F-1 is, for example, a guide indicating "be careful not to pass because it is now close.

Even when the guide is not a photographing guide, but a guide for inspection, the inference may change according to situations such as a situation where water inside a sewer pipe is frozen and a situation where fallen leaves or the like are clogged, and thus it is meaningful to consider seasonality. Furthermore, an inspection object may be discriminated like an old pipe and a new pipe. In an inspection of an old private house, an image group obtained in the past may be more appropriate as teacher data.

As described above, such an application that learning is switched by effectively using time information may be effective in many cases. When it is impossible to draw an inference with predetermined reliability, a guide inference in which the teacher data is divided and situations trending to cause errors are distinguished as the second teacher data may be performed.

After the learning matrix is set in step S45, position information of an object is acquired (S47), and then an inference model is generated (S49). In the step, plural inference models are generated as needed. In some cases, it is impossible to perform a guide by one inference model regardless of the situation (e.g., season). Therefore, it is necessary to generate plural inference models for each situation.

After the inference model is generated in step S49, it is next determined whether the inference reliability is not less than a predetermined value (S51). When the result of the determination indicates that the inference reliability is not equal to the predetermined value or more, other information is added (S52). Here, not only image data, but also other information is added when the learning matrix is reset. For example, position information acquired by GPS, movement information of the camera 10 acquired by an acceleration sensor, and the like are available.

When the other information is added in step S52, the learning matrix is reset by using the information (S53). Then, the generation of the inference model has not been performed by a predetermined number of times or more (S55: No), the processing returns to step S47.

On the other hand, when the determination result in step S55 indicates that the reliability is not enhanced even by performing the inference by a predetermined number of times or more, or when the determination result in step S51 indicates that the inference reliability is not less than a predetermined value, it is determined that plural models are generated (S60). When the determination result in step S55 indicates that generation of an inference model is performed by a predetermined number of times or more, data for learning may lack uniformity, so that an inference having correct reliability may not be performed by the same inference model. In step S49, plural inference models may be generated. In the case of an example of leading to a photographing point as shown in FIGS. 13A to 13E, as described in the example of season and time, a snow scene and a summer scene for the same place do not seem to show the same place because the landscapes of the place seem different from each other, and thus it may not be appropriate to use the same inference engine. Under such a situation, by categorizing scenes into the snow scene and other scenes, it is possible to perform a highly reliable inference.

It is determined in step S60 whether it is preferable to generate plural models. Whether the determination is made based on plural models is determined by analyzing conditions appended to an image (such as date and time, the image itself, other meta data) and determining whether grouping is possible. When the determination result indicates that large grouping is possible, it will be better to perform learning for each group. When another condition is added in step S52, an inference model meeting the condition may be additionally generated.

When the determination result in step S60 indicates that plural inference models have not been generated, an inference model is transmitted (S61). Here, the inference model (one inference model) generated in step S49 is transmitted to the camera 10. On the other hand, when the determination result in step S60 indicates that plural inference models have been generated, an inference model for each condition is transmitted (S67). In step S67, an inference model for each additional condition is transmitted to the camera 10. When the inference model is transmitted in step S61 or step S67, the processing returns to step S41.

The inference models as a learning result are set to be able to handle plural situations, so that a guide under a specific situation may become inadequate. In this case, a confusing guide will be released. It is preferable to use such resulting data as negative samples (second teacher data) for learning and output a guide for drawing attention because the data are confusing. When a learning result does not make it possible to draw an inference with predetermined reliability, for example, when a model capable of providing a highly reliable output cannot be obtained even when learning is performed while changing weighting or a layer configuration, a guide inference in which the teacher data is divided and situations trending to cause errors are distinguished as the second teacher data may be performed.

As described above, in the second modification of the flow of the external equipment control, both the success case and the failure case are used as teacher data. Therefore, the inference models can indicate inference results not only in success cases, but also in failure cases. Furthermore, when the learning matrix is reset, other information is added. Therefore, an inference model can be efficiently generated. In addition, an inference model can be generated for each condition, and a detailed image pickup guide can be performed.

Figure 11:
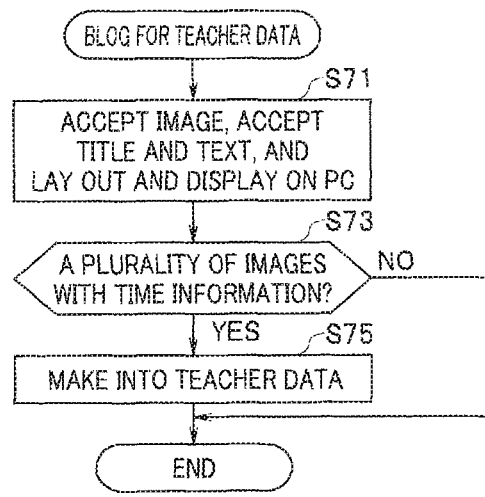
FIG. 11 is a flowchart showing an operation of a blog for teacher data in the image pickup system according to the first embodiment of the present invention.

Next, an operation of generating teacher data from blogs published on the Internet will be described with reference to a flowchart shown in FIG. 11. In the flowchart, user's PC or the like generates teacher data from images, etc. uploaded into blogs, etc. in order to generate teacher data to be used when an inference model is generated in step S49 of FIGS. 7, 9 and 10. The operation is executed frequently by PC (personal computer), and the generated teacher data is transmitted to the learning section 21 in the external equipment 20.

Many photographs are published in the blogs uploaded through the Internet. A series of photographs taken at sightseeing resorts, etc. are uploaded into a blog, and information such as photographing position information and photographing date and time information is often associated with the photographs. Furthermore, various pieces of information can be obtained from titles and texts appended to the photographs. By using the photographs and information, it is possible to obtain identification of photographing objects (specific targets), photographing advices such as highlights in the vicinity of the photographing objects, and advices for photographing highlights. Therefore, in the present embodiment, teacher data is generated from photographs and appended information uploaded to a blog.

When a flow of a blog for teacher data starts, an image is accepted, a title and a text are accepted, and further the image, the title, and the text are laid out and displayed on PC (S71). Here, PC or the like connected to the Internet or the like acquires an image uploaded to a blog or the like, and also acquires a title or a text appended to the image. When the image, title and text are acquired, the image, title and text are placed and displayed on the screen of the PC. Note that display of the acquired images and the like may be omitted when only teacher data is generated.

Next, it is determined whether plural images exist and also time information exists (S73). As described above, in order to obtain a photographing advice or the like by inference, it is preferable that a series of plural images is contained in one blog and also time information and the like are associated with the images. Therefore, in the step, it is determined whether plural images exist and time information is associated with the images. It goes without saying that photographs published in plural blogs may be regarded and processed as if the photographs are configured by a series of plural images.

When the determination result in step 73 indicates that plural images exist and time information is associated with the images, teacher data is generated (S75). By tracing a series of images in conformity with time lapse, it is possible to know photographing order in which a blog contributor takes photographs. Furthermore, by comparing the series of images with photographs taken by other blog contributors, it is possible to know points where many blog contributors take photographs, that is, highlights. Based on the information, teacher data for generating inference models for inferring photographing objects (specific targets) and photographing advices are generated. In the case where a large number of moving pictures are contributed and persons who are good at framing and persons who are poor at framing contribute the moving pictures, the moving pictures have been appraised by viewers. Accordingly, the evaluation of the moving pictures provides good models for moving pictures. However, the moving pictures are contributed as works, and thus by extracting only panning parts or scene transition parts of the moving pictures and setting the parts as teacher data, it is possible to obtain teacher data for each photographing technique. In general, highly evaluated moving pictures are carefully captured by using special equipment and staff and all the scenes in such high-motivated moving pictures can become teacher data of excellent time-sequential image groups. In other words, a series of plural images obtained time-sequentially when a specific target is photographed may be set as a population or a candidate of a population, and a time-sequential image group having information indicating that screen transition of the image group look attractive may be further extracted and set as teacher data from the population or the candidate of the population to generate an inference model. Other time-sequential image groups contained in the population may be set as negative samples. A time-sequential image group having a low evaluation may be set as negative samples (second teacher data), and difference-emphasized learning may be performed.

When teacher data is created in step S75, or when the determination result in step S73 indicates that neither plural images nor time information exists, the flow of the blog for the teacher data is terminated.

As described above, in the flow of the blog for teacher data, the teacher data is generated by using information published in the blog or the like which is uploaded through the Internet. Many photographs and information related to the photographs are provided for places where many people visit By analyzing the time information and the position information, it is possible to know traveling routes of many people and photographing points and generate teacher data based on analysis results.

Note that although it has been described that the flow of the blog for teacher data generate teacher data in PC, the present invention is not limited to the style, and it goes without saying that the learning section 21 in the external equipment 20 may search blogs at any time and generate teacher data.

Next, an application example of the image pickup system according to the present embodiment will be described with reference to FIG. 12 and FIGS. 13A to 13E. FIG. 12 shows an example of a teacher image when the present embodiment is applied to an industrial endoscope for observing the inside of a pipe. An upper stage of FIG. 12 shows a state where an industrial endoscope 101 is inserted in a pipe 111.

An insertion portion 102 of the industrial endoscope 101 has flexibility and is tubular. The insertion portion 102 includes a distal end portion 102a, a bending portion 102b, and a flexible tubular portion 102c in order from a distal end side. The bending portion 102b has, for example, plural bending pieces, which are not shown. The bending portion 102b is freely bendable, and can be bent in any direction by a user's hand-side operation. The distal end portion 102a is provided with an image pickup device such as CCD (charge coupled device) image sensor or CMOS (complementary metal oxide semiconductor) image sensor, which are not shown, and an image pickup section 103 having a lighting section, which is not shown.

A pipe 111 includes two pipes of a pipe 111a and a pipe 111b, and the pipe 111a and the pipe 111b are joined to each other at a joint 112. In an example shown in FIG. 12, ring-shaped rust 113 occurs inside the joint 112 and bulges inwardly.

FIG. 12 shows a state where the insertion portion 102 of the industrial endoscope 101 is inserted in the pipe 111 in order to observe the state of the rust 113. The upper stage of FIG. 12 shows a case where the distal end portion 102a of the insertion portion 102 has been successfully moved to an observation position of the rust 113. On the other hand, a lower stage of FIG. 12 shows a case where the distal end portion 102a of the insertion portion 102 has not been successfully moved to the observation position of the rust 113.

Images P1 to P9 shown at a lower portion of the upper stage of FIG. 12 represent images acquired by the image pickup section 103 of the industrial endoscope 101. The images P1 to P3 are captured in the vicinity of an entrance portion of the pipe 111, and a distance of the pipe 111 is dark (see black circle). The image P4 is an image captured at time T=0, and the rust 113 appears outside the black circle representing the distance.

On the upper stage of FIG. 12, when the insertion portion 102 is further advanced at time T1 and the bending portion 102b is bent to point the distal end portion 102a downward in order to observe the rust 113, the image pickup section 103 captures the image P5. When the distal end portion 102a of the insertion portion 102 is further moved downward at time T2, the image pickup section 103 captures the image P6, then captures the image P7 at time T3 and then captures the image P8 at time T4. At time T5, the insertion portion 102 is located at a position shown on the upper stage of FIG. 12, and as shown by the image P9, the rust 113 can be observed from an upper side (a center portion side of the pipe 111).

As is apparent from the upper stage of FIG. 12, in order to observe the rust 113 with the industrial endoscope 101, the distal end portion of the industrial endoscope 101 is temporarily moved upward (see times T0 to T2, the image P4 to P6). Thereafter, when the distal end portion 102a is moved to a position in the vicinity of the rust 113, the bending portion 102b is bent to spot the distal end portion 102a downward (times T3 to T4, the images P7 to P8), whereby the rust 113 can be observed from an upper side (time T5, the image P9).

On the lower stage of FIG. 12, images captured before time T0 are the same as images in the case of the upper stage of FIG. 12. When at time T1, the distal end portion 102a of the insertion portion 102 is pointed downward and moved and proceeds as it is (times T1 to T3 and images P15 to P17), the distal end portion finally impinges against the rust 113 (time T4, image P18). In this case, the rust 113 cannot be observed from an upper side.

As described above, when the insertion portion 102 of the industrial endoscope 101 is inserted into the pipe 111 to observe the inside of the pipe 111, it is possible to observe a target object (rust 113) by inserting the insertion portion 102 as shown on the upper stage of FIG. 12. On the other hand, when the insertion portion 102 is inserted as shown on the lower stage of FIG. 12, the target object (rust 113) cannot be observed. Therefore, the images captured when the insertion portion 102 has successfully reached the target object as in the case of the upper stage of FIG. 12 are set as successful teacher data, and the images captured when the insertion portion 102 has not successfully reached the target object as in the case of the lower stage of FIG. 12 are set as unsuccessful teacher data. Therefore, when deep learning is performed with the teacher data to generate an inference model, it is possible to draw an inference for guiding when the insertion portion 102 of the industrial endoscope 101 is inserted. In addition, when the inference model is created, the inference model may be created by using difference data as shown in FIG. 4.

Next, FIGS. 13A to 13E show an example in which a user photographs a highlight when the user visits "Nikko" as a sightseeing spot with a camera. FIG. 13A shows a state where the user points the camera 10 at a building "Sacred Stable" in Nikko. A broken line in FIG. 13A indicates a photographing range of the camera 10. At this time, a photographing guide is displayed on the display section 14 of the camera 10 together with a through image as shown in FIG. 13B. It is displayed as the photographing guide that a photographing object is "Sacred Stable" and a highlight in the Sacred Stable is "Three Wise Monkeys".

The "Three Wise Monkeys" is a sculpture in the "Sacred Stable" as shown in FIG. 13C, but it is small and inconspicuous. Therefore, some users do not perceive the "Three Wise Monkeys" unless "Highlight Three Wise Monkeys" is displayed. In the present embodiment, when it is determined by the inference engine 12 that the user is in the vicinity of the "Sacred Stable", a photographing guide as shown in FIG. 13B is displayed (see S3 to S11 in FIG. 6).

FIG. 13D shows a case where the user points the camera at the "Three Wise Monkeys" according to the photographing guide, and at this time, "access OK" is displayed (see S15 and S17 in FIG. 6). On the other hand, FIG. 13E shows a case where the user has passed "Three Wise Monkeys", and at this time, "access NG" is displayed (see S15 and S19 in FIG. 6). When "access is OK" is displayed, the user decides a composition and operates the release button, whereby the user can take a picture of the "Three Wise Monkeys" as shown in FIG. 13C.

As described above, in the first embodiment and the modification of the present invention, a series of plural images obtained time-sequentially when a specific target is photographed is set as a population (for example, see S45 of FIGS. 7 and 10, and S45a of FIG. 9), and an inference model is generated by using, as teacher data, the sequential images selected from the set population based on whether the specific target can be accessed (for example, S49 of FIGS. 2, 3 and 7, etc.). Therefore, it is possible to generate an inference model for enabling a target image to be easily obtained. For example, since teacher data is generated based on whether a specific target can be accessed based on time information and/or position information associated with an image, an image as a target can be easily obtained.

In the first embodiment and the modification of the present invention, a learned model is generated by a setting step of setting, as a population, a series of plural images obtained time-sequentially when a specific target is photographed (for example, see S45 of FIGS. 7 and 10, S45a of FIG. 9), and a generating step of generating an inference model by using, as teacher data, the sequential images selected from the set population based on whether the specific target can be accessed (for example, see S49 of FIGS. 2, 3, and 7). Furthermore, a learning program for causing a computer to execute the setting step and the generating step described above has been also disclosed. The learning program is stored in the memory inside the control section 26, and the CPU in the control section 26 controls the interior of the equipment according to the learning program, and executes the respective steps. Furthermore, an inference model producing method having the setting step and the generating steps described above has been also disclosed. Still furthermore, an inference model producing method having the above-mentioned setting step and a generating step of inputting difference data of time-sequentially obtained images to generate an inference model.

In the first embodiment and the modification of the present invention, a series of plural images obtained time-sequentially when a specific target is photographed is set as a population, an inference model generated by using, as teacher data, the sequential images selected from the set population based on whether the specific target can be accessed is stored (for example, see S35 of FIG. 6), an object is converted to image data (for example, see S3 of FIG. 6), and an inference result obtained by the stored inference model is displayed on the display section when the image data are converted (for example, see S11 of FIG. 6).

Note that in the first embodiment and the modification of the present invention, the learning by the learning device performs deep learning, but may be learning using artificial intelligence such as machine learning without being limited to the deep learning. In the first embodiment and the modification of the present invention, the learning section receives the learning request (request) from the camera (for example, see S31 and S32 of FIG. 6 and S41 of FIG. 7). The learning request (request) may be received from external equipment such as a personal computer and a portable information device (including a smartphone) as well as the above devices.

The inference engine 12 is provided in the camera 10, and receives image data acquired by the image pickup section 103 to perform inference. However, the present invention is not limited to the style, and the inference engine 12 may be provided in the external equipment 20, so that image data acquired by the image pickup section 103 of the camera are transmitted to the external equipment 20 through the communication sections 13 and 22, and inference of a photographing guide is performed by the inference engine in the external equipment 20. In this case, an inference result may be transmitted to the camera 10 through the communication sections 22 and 13, and displayed on the display section 14.

Note that the present embodiment has been described while the digital camera is used as equipment for photographing, but the camera may be a digital single lens reflex camera, a mirrorless camera or a compact digital camera, a camera for moving pictures such as a video camera or a movie camera, and further may be a camera incorporated in a cellular phone, a smartphone, a portable information terminal, a personal computer (PC), a tablet computer, or a game machine, a medical camera, a camera for a scientific instrument such as a microscope, a camera to be mounted in a vehicle, or a surveillance camera. In any case, the present invention can be applied to any device insofar as the device can receive image data and directly or indirectly access an external image database.

It goes without saying that "deep learning" may be replaced by "machine learning" in the portion which has been described above with respect to "deep learning", and an application may be performed by using neither the artificial intelligence nor the inference model. As have been described above, when it is enough just to output only a simple and general guide such as "fast or slow", "different from a model", "right", "left", "up", "down", or "oblique" based on the difference in image change, it can be dealt with by branching of a simple flowchart or the like. However, by using the machine learning, it is possible to draw highly reliable inferences even if the situation is not exactly the same.

Second Embodiment

Figure 14:
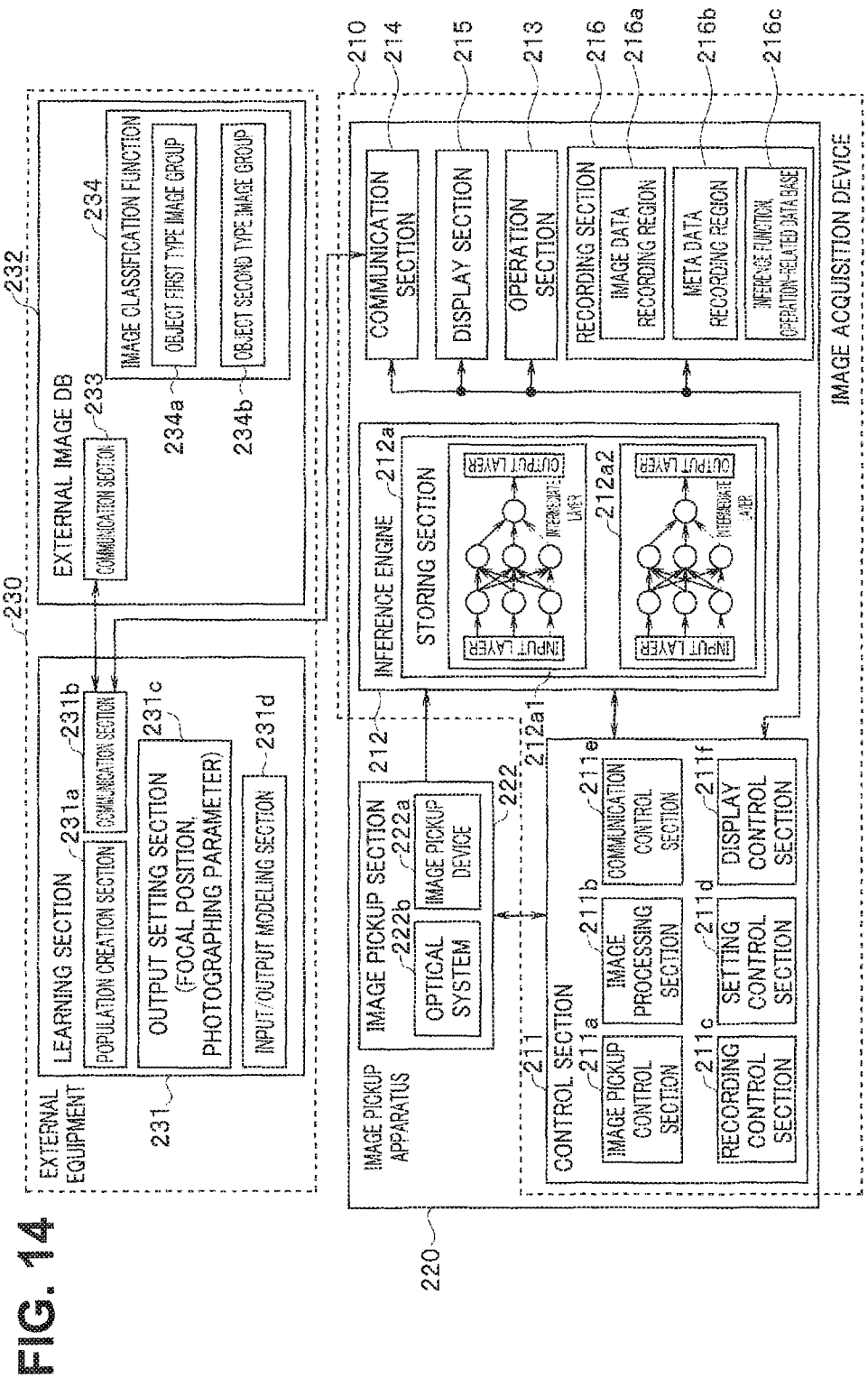
FIG. 14 is a block diagram showing an image pickup apparatus containing an image acquiring device according to a second embodiment of the present invention.

FIG. 14 is a block diagram showing a second embodiment of the present invention.

Since machine learning such as deep learning imitates that a human's intracerebral recognizes an object from various features of an image or the like of the object by using a network of nerve cells called neurons and is configured in a multilayer structure, it has such a problem as if input/output of an acquired "inference model" is performed in a black box. Therefore, it is important to identify what type of "inference model" is used. Here, in order to clarify information on use, when an inference section configured to draw an inference with an inputted image (not limited to an image) by using a predetermined inference model is provided, an inference result of the inference section is presented so that a user can know the inference result, and also use information on use of the inference model is recorded as meta data of the image based on a determination result of a determination section configured to determine whether the inference result is adopted, thereby preventing black-boxing.

In the present embodiment, when predetermined information is inputted, it is grasped whether an inference result using a predetermined inference model is adopted or not, and if adopted, it is grasped which inference model is adopted, thereby enhancing effectiveness of the inference. In the present embodiment, information on use of an inference model as described above (hereinafter referred to as inference model use information) is recorded, and, for example, inference model use information is recorded as meta data of images synchronized with a timing at which the inference model is used. Note that the inference model use information is not limited to the meta data of images, but may be recorded as meta data of various kinds of information. Furthermore, the inference model use information may be recorded alone together with information for specifying a scene to be used, for example, time information.

The user can set use of inference models in some cases. In this case, by recording the inference model use information as an evidence, the inference model use information serves as a determination material as to whether the user's decision regarding the use of the inference model is correct, and also serves as a determination material as to effectiveness of the inference model. In addition, the inference model use information can also be used to clarify an application range of inference models.

An image pickup apparatus 220 shown in FIG. 14 is configured to include an image acquisition device 210. The image pickup apparatus 220 photographs an object, and the image acquisition device 210 in the image pickup apparatus 220 records an image acquired by image pickup. Not only a digital camera or a video camera, but also a camera incorporated in a smartphone or a tablet terminal may be adopted as the image pickup apparatus 220. Furthermore, a microscope, an endoscope, a CT scanner or the like may be adopted as the image pickup apparatus 220, and various image pickup apparatuses configured to acquire an image using white light, ultraviolet light, infrared light, X-rays, ultrasonic waves, etc. can be adopted. Note that FIG. 14 shows an example in which the image acquisition device 210 is configured in the image pickup apparatus 220, but the image pickup apparatus 220 and the image acquisition device 210 may be configured separately from each other.

The image acquisition device 210 is allowed to use an inference model when an image is acquired as described later, and the image acquisition device 210 may acquire an image by using a pre-installed inference model, or acquire an inference model from external equipment 230. In other words, the external equipment 230 is used as needed.

The image pickup apparatus 220 includes a control section 211 and an image pickup section 222. The control section 211 may be configured by a processor using CPU or the like, and may operate according to a program stored in a memory, which is not shown, to control each section, or may realize some or all of functions by electronic circuits of hardware.

The image pickup section 222 includes an image pickup device 222a and an optical system 222b. The optical system 222 b includes lenses, an aperture, and the like, which are not shown, for zooming and focusing. The optical system 222b includes a zoom (magnification) mechanism, focus and aperture mechanisms, which are not shown, for driving these lenses.

The image pickup device 222a is configured by a CCD or CMOS sensor or the like, and an optical image of an object is led to an image pickup surface of the image pickup device 222a by the optical system 222b. The image pickup device 222a photoelectrically converts the optical image of the object to acquire a pickup image (image pickup signal) of the subject.

An image pickup control section 211a of the control section 211 can control to drive the zoom mechanism, the focusing mechanism, and the aperture mechanism of the optical system 222b to adjust the zoom, the aperture and the focus. The image pickup section 222 is controlled by the image pickup control section 211a to perform image pickup, and outputs an image pickup signal of a pickup image (a moving picture and a still image) to the control section 211 as an image acquisition section.

The image pickup apparatus 220 is provided with an operation section 213. The operation section 213 includes a release button, a function button, various switches for photographing mode setting, parameter operation, etc., a dial, a ring member and the like, which are not shown, and outputs an operation signal based on a user operation to the control section 211. The control section 211 controls each section based on the operation signal from the operation section 213.

The control section 211 receives a pickup image (moving image and still image) from the image pickup section 222. An image processing section 211b of the control section 211 performs predetermined signal processing, for example, color adjustment processing, matrix conversion processing, noise removal processing, and various other kinds of signal processing on the received pickup image.

The image pickup apparatus 220 is provided with a display section 215, and the control section 211 is provided with a display control section 211f. The display section 215 has, for example, a display screen of an LCD (liquid crystal display), and the display screen is provided on a rear surface of a housing of the image pickup apparatus 220 or the like. The display control section 211f causes the display section 215 to display the pickup image which has been subjected to the signal processing by the image processing section 211b. The display control section 211f can also cause the display section 215 to display various kinds of menu displays, warning displays, etc. of the image pickup apparatus 220.

The image pickup apparatus 220 is provided with a communication section 214, and the control section 211 is provided with a communication control section 211e. The communication section 214 is controlled by the communication control section 211e, and is enabled to transmit and receive information to and from the external equipment 230. The communication section 214 can perform, for example, short-distance wireless communication such as Bluetooth (registered trademark) and, for example, wireless LAN communication such as Wi-Fi (registered trademark). Note that the communication section 214 is not limited to Bluetooth and Wi-Fi, and can adopt communication using various kinds of communication methods. The communication control section 211e can receive information on inference models from the external equipment 230 via the communication section 214.

The control section 211 is provided with a recording control section 211c. The recording control section 211c can perform compression processing on the signal-processed pickup image, and can provide the compressed image to the recording section 216 to record the compressed image. The recording section 216 is configured by a predetermined recording medium, and can record information given from the control section 211 and output recorded information to the control section 211. For example, a card interface can be adopted as the recording section 216, and the recording section 216 can record image data on a recording medium such as a memory card.

In the present embodiment, the recording section 216 has an image data recording region 216a and a meta data recording region 216b, and the recording control section 211c records image data into the image data recording region 216a. The recording control section 211c records inference model use information as meta data into the meta data recording region 216b. Note that the recording control section 211c can also read out and reproduce information recorded in the recording section 216.

In the present embodiment, the image pickup apparatus 220 is provided with an inference engine 212 as an inference section. The inference engine 212 includes a storing section 212a, and the storing section 212a is provided with one or more dictionaries (two dictionaries 212a1 and 212a2 in FIG. 14). Each of the dictionaries 212a1 and 212a2 is configured by a network obtained by completing learning in machine learning, that is, inference models. Note that each of the dictionaries 212a1 and 212a2 can be identified by an assigned dictionary ID. For example, even when a dictionary is fetched from the external equipment 230, only a necessary dictionary can be fetched by the dictionary ID.

Figure 15:
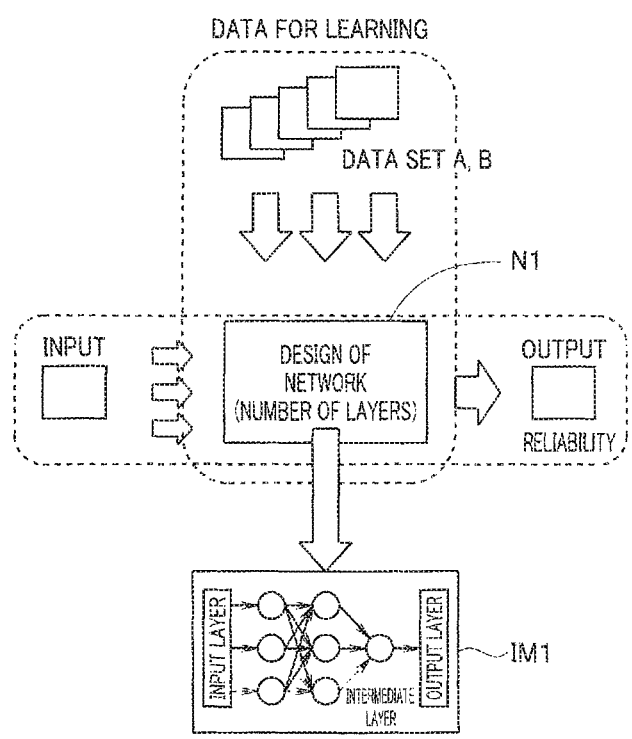
FIG. 15 is a diagram for describing dictionaries 212a1 and 212a2 stored in a storing section 212a of an inference engine 212.

Like FIG. 4, FIG. 15 is a conceptual diagram showing a way of performing learning when an inference model is acquired, and here is a diagram describing the dictionaries 212a1 and 212a2 stored in the storing section 212a of the inference engine 212. In FIG. 15, large amounts of data sets corresponding to an input A and an output B are given as learning data to a predetermined network N1. As a result, a network design is determined for the network N1 so that the output B corresponding to the input A is obtained. Note that various publicly known networks may be adopted as the network N1 adopted for machine learning. For example, R-CNN (regions with CNN features) using CNN (convolution neural network), FCN (fully convolutional networks) may be used. Also, not only deep learning, but also various publicly known machine learning methods may be adopted to acquire an inference model.

By giving a large amount of data set to the network N1, the design for the network N1 is determined so that the relationship between an input and an output similar to the relationship between the input A and the output B can be obtained with high reliability. As a result, the learned network N1 can be used as an inference model IM1.

The dictionary 212a1 corresponding to the inference model IM1 is stored in the storing section 212a of the inference engine 212. In addition, the dictionary 212a2 corresponding to an inference mode acquired by using a network to which a large amount of data set having an input/output relationship different from the relationship between the input A and the output B described above are given as learning data is stored in the storing section 212a.

The control section 211 is provided with a setting control section 211d, and the setting control section 211d can control the inference engine 212 to perform inference using the inference engine 212. The control section 211 may control each section according to an inference result by the inference engine 212. For example, in a case where the inference engine 212 also detects an object on which focus control is performed, when a pickup image is given to the inference engine 212, the inference engine 212 determines whether the object exists in the pickup image. When the object exists, the position of the object in the pickup image is outputted to the control section 211. In this case, the image pickup control section 211a performs the focus control so as to focus on the position of the detected object.

In the present embodiment, the setting control section 211d can control the display control section 211f as a presentation section to display an inference result of the inference engine 212 on the display screen of the display section 215. For example, when an object to be subjected to focus control is detected based on the inference of the inference engine 212, the display control section 211f may cause a display for recognizing a detection result, for example, a frame display surrounding the detected object to be displayed.

Note that the setting control section 211d may be allowed to present an inference result of the inference engine 212 to the user according to various methods without being limited to displaying. For example, the setting control section 211d may present the inference result with voice, or may present the inference result under the mechanical control of the driving section.

In the present embodiment, the setting control section 211d as a determination section performs determination based on a user operation on the operation section 213 or determination based on image analysis on a pickup image which has been subjected to signal processing by the image processing section 211b, thereby determining whether inference using the inference engine 212 is adopted. When the inference is adopted, it is allowed to determine and set with which dictionary the inference is adopted.

As described above, since the user operates the operation section 213 while reflecting a specific intention, a user operation is prevailing information to determine whether an inference result is effective to the user. Particularly, in equipment for personal use, it can be considered that an operation by a user operating the equipment is based on user's determination. On the other hand, even in the case of equipment used by various people, by providing a function of personal identification, for example, by providing fingerprint authentication in the operation section 213 or performing voiceprint authentication based on voice when the user uses the equipment, a similar effect can be expected. Equipment to be operated with voice multiplies, and in this case, a function of collecting voice and determining the content of the voice serves as the operation section, and at this time, combined use of voiceprint authentication becomes easy.

With respect to determination as to which operation on the operation section 213 rejects which inference result, the setting control section 211d may determine based on pre-registered information. For example, the recording section 216 may be provided with an inference function and operation related database 216c. The inference function and operation related database 216c is a database as to what kind of control the inference result corresponds to, and which operation section the control is related to, and the setting control section 211d is enabled to determine an operation of adopting or rejecting an inference result (hereinafter, also referred to as a related operation) by referring to the inference function and operation related database 216c. For example, in the case where the inference model aims to realization of the focus function, when an operation of operating a focus ring is performed for display of a result of the inference function indicating that the focus function is achieved, the setting control section 211d can determine that the user has rejected the inference result.

The setting control section 211d provides information on the setting (inference model use information) to the recording control section 211c. As a result, the recording control section 211c causes the inference model use information to be stored as meta data of a pickup image obtained by the image pickup section 222 in the meta data recording region 216b of the recording section 216 in synchronization with the pickup image. In this way, evidence about the use of inference models is recorded.

The image pickup apparatus 220 can also acquire an inference model from the external equipment 230 via the communication section 214. The external equipment 230 includes a learning section 231 and an external image database (DB) 232. The learning section 231 has a communication section 231b, and the external image DB 232 has a communication section 33. The communication sections 231b and 33 can communicate with each other, and the communication section 231b can also communicate with the communication section 214.

The learning section 231 includes a population creation section 231a, an output setting section 231c, and an input/output modeling section 231d. The external image DB 232 includes an image classification function section 234. The image classification function section 234 classifies and records plural images for each type of objects contained in the image. In an example of FIG. 14, it is shown that the image classification function section 234 records an object first type image group and an object second type image group, but the number of types to be classified can be set arbitrarily.

The population creation section 231a reads images from the external image DB 232, and creates a population serving as an origin of learning data. The output setting section 231c sets an output for the images of the population. For example, it is considered that the apparatus shown in FIG. 14 is used to detect an object which is a target for focusing on a pickup image. For example, when focusing on a human's eye in a pickup image, an image portion of the eye is detected by inference. In this case, the population creation section 231a uses images of the eye as a population, and the output setting section 231c sets parameters used under image pickup and focus positions together with information indicating that the image is the eye.

The input/output modeling section 231d generates a learning model (inference model) which has learned the relationship between the population of images created by the population creation section 231a and the output set by the output setting section 231c, for example, according to a method shown in FIG. 15. When a request is made by the control section 211 of the image acquisition device 210, the learning section 231 transmits the generated inference model to the image acquisition device 210 via the communication sections 231b and 214. The control section 211 can cause the inference model acquired via the communication section 214 to be stored as a dictionary in the storing section 212a of the inference engine 212.

Figure 16:
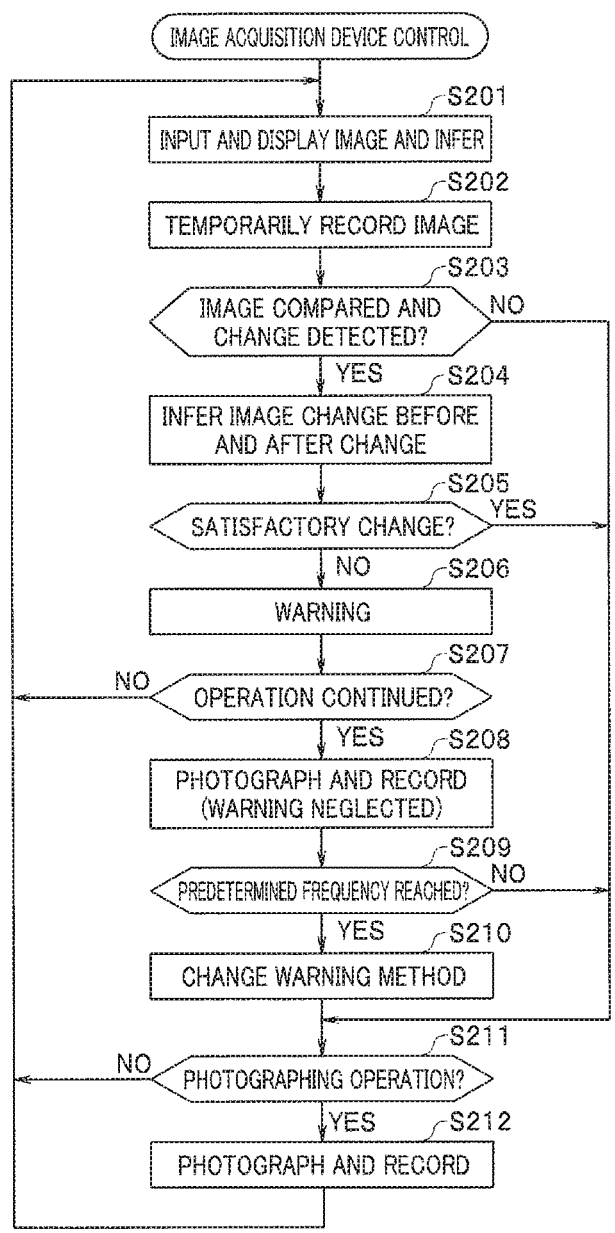
FIG. 16 is a flowchart showing an operation of the image acquiring device 210.
Figure 17:
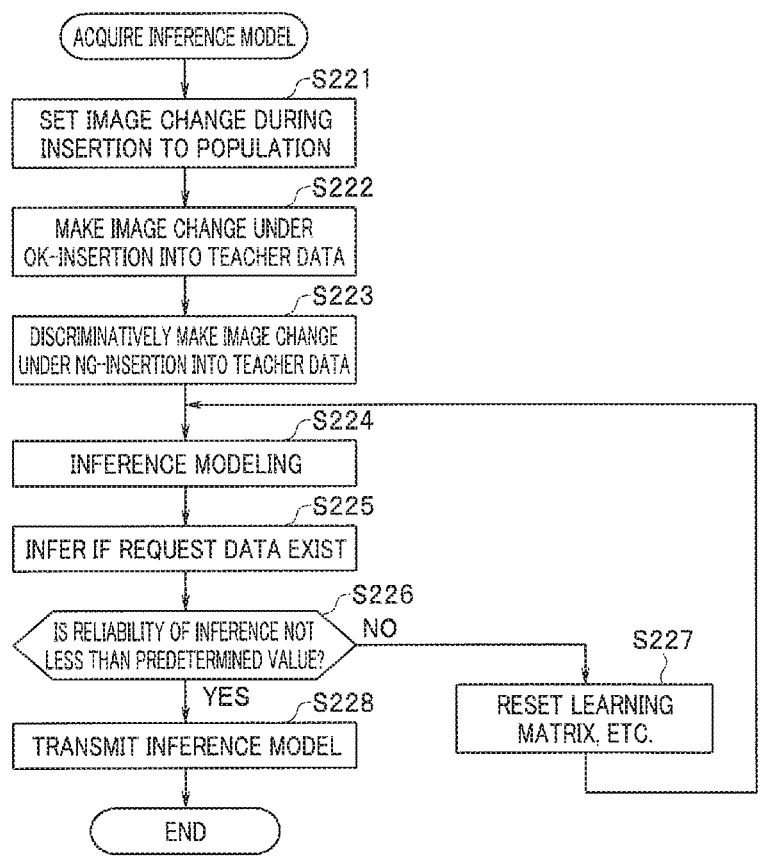
FIG. 17 is a flowchart showing an operation of external equipment 230.
Figure 18:
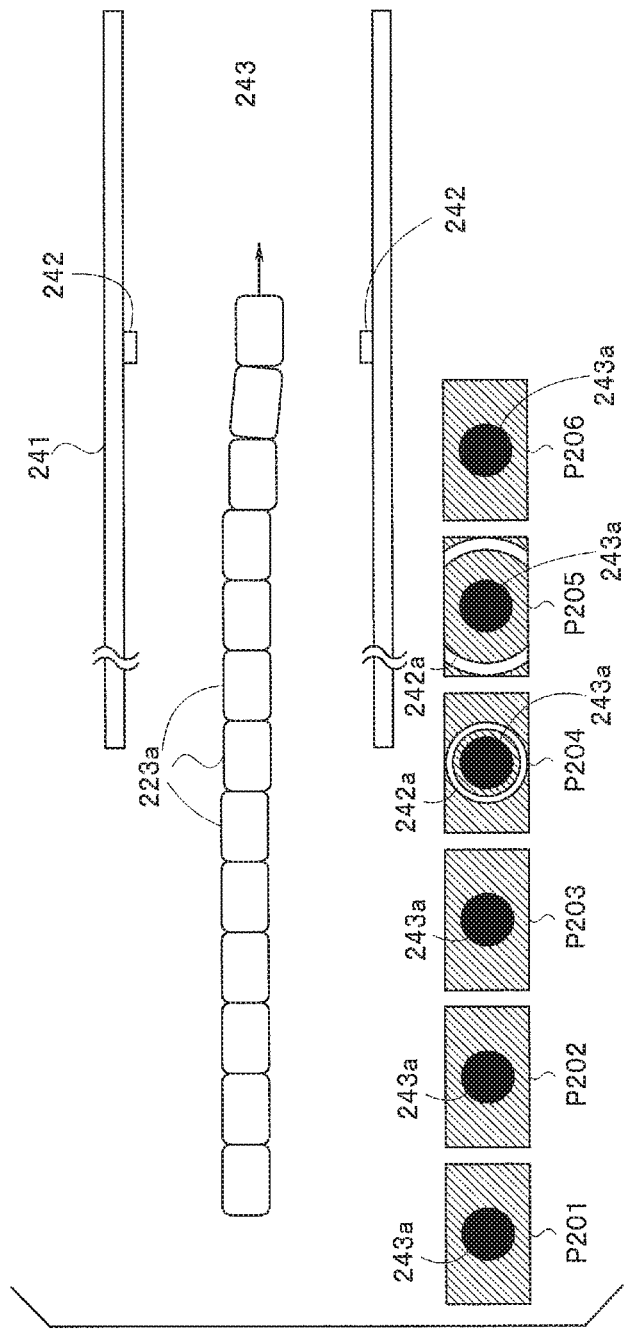
FIG. 18 is a diagram for describing an operation of the second embodiment.
Figure 19:
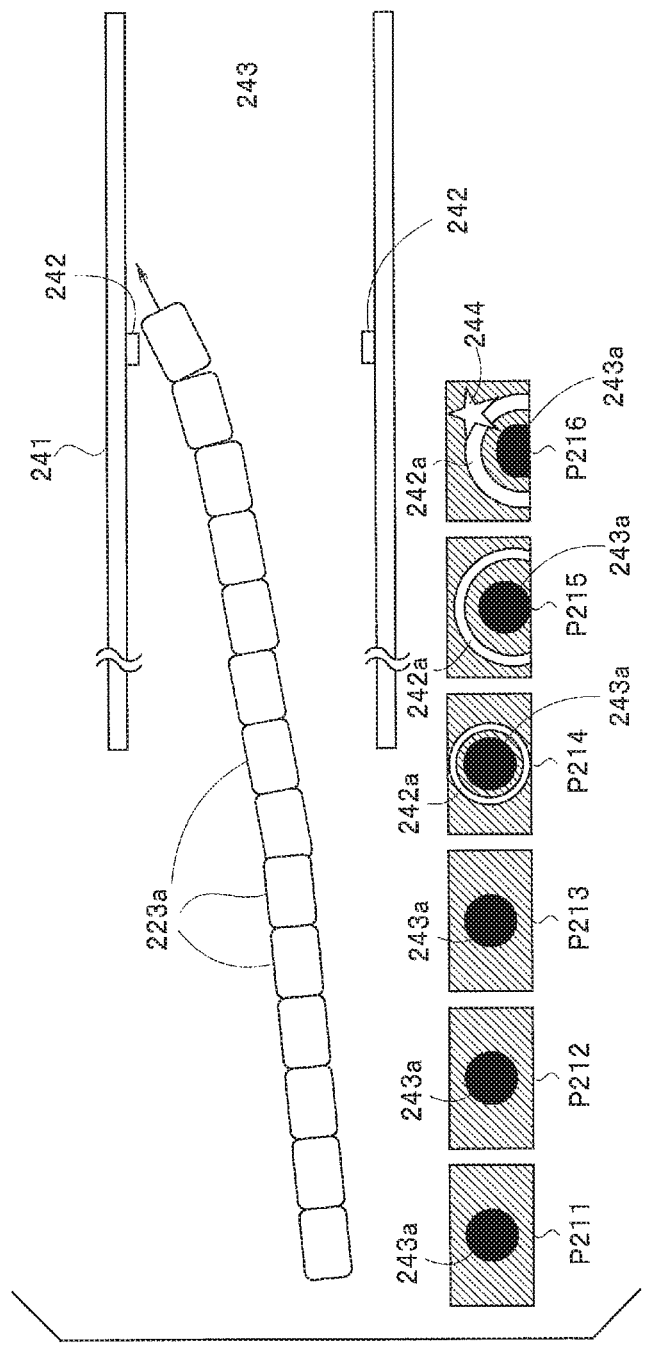
FIG. 19 is a diagram for describing an operation of the second embodiment.

Next, an operation of the thus-configured embodiment will be described with reference to FIGS. 16 to 19. FIGS. 16 and 17 are flowcharts showing the operation of the second embodiment. FIG. 16 shows an operation of the image acquisition device 210, and FIG. 17 shows an operation of the external equipment 230. FIGS. 18 and 19 are diagrams showing the operation of the second embodiment.

FIGS. 16 to 19 are diagrams describing an operation when an industrial endoscope is configured by the image pickup apparatus 220 of FIG. 14. For example, it is assumed that the image pickup apparatus 220 is configured by accommodating the image pickup section 222 of FIG. 14 in a distal end portion 223a of the insertion portion of the industrial endoscope. Note that the image pickup section 222 is assumed to be capable of photographing a distal end side of the distal end portion 223a. FIG. 18 shows a state of such movement of the distal end portion 223a by change of the position of the distal end portion 223a at predetermined time intervals, and the insertion portion extending from the distal end portion 223a to the proximal end side is not shown. In the example of FIG. 18, the distal end portion 223a enters from an entrance side of the pipe 241 and advances in a direction to a deep portion 243 of the lumen of the pipe 241 as indicated by an arrow. Images P201, P202, etc. in FIG. 18 represent images which are sequentially picked up and acquired by the image pickup section 222 while following movement of the distal end portion 223a.

At the timing when the images P201 to P203 are obtained, the distal end portion 223a faces a direction to a substantially deep portion 243, and an image 243a of the deep portion 243 of the lumen is contained substantially at the centers of the images P201 to P203. A convex portion 242 is formed on the inner wall of the pipe 241, and when the distal end portion 223a approaches the convex portion 242, an image 242a of the convex portion 242 which is visible in the image P204 is picked up. As the distal end portion 223a further approaches the convex portion 242, the image 242a is picked up in a large size as shown in an image P205. Furthermore, when the distal end portion 223a advances to the deep portion 243 side, the image 242a is not contained in an image P206.

In the images P201 to P206, it is apparent that the image 243a of the deep portion 243 is always located substantially at the centers of the images, and the distal end portion 223a advances in the direction to the deep portion 243. It is assumed that images similar to the images P201 to P206 and an inference model acquired as a result of learning about the change of the images are stored as a dictionary in the storing section 212a of the inference engine 212. In other words, the inference engine 212 can infer a change of a pickup image when the insertion portion is correctly inserted.

FIG. 16 shows an example in which it is determined by inference whether the insertion is being correctly performed when the insertion portion of the endoscope is inserted. Image pickup is performed by the image pickup section 222 accommodated in the distal end portion 223a when the insertion portion is inserted. In step S201 of FIG. 16, the control section 211 of the image pickup apparatus 220 takes in an image which is picked up and acquired by the image pickup section 222. The display control section 211f of the control section 211 gives the pickup image to the display section 215 to display the pickup image. The control section 211 gives the pickup image to the inference engine 212 and causes the inference engine 12 to draw an inference as to whether the insertion portion is correctly inserted.

In other words, in step S202, the recording control section 211c of the control section 211 provides the inference engine 212 with two sequentially-captured pickup images while providing pickup images to the recording section 216 to temporarily record the pickup images. The inference engine 212 compares the sequentially-captured images with each other to detect the presence or absence of a change (step S203). Furthermore, when detecting a change between the two images, the inference engine 212 shifts the processing from step S203 to step S204 to infer whether the change between the images before and after the change is a change when the insertion portion is correctly inserted, and outputs an inference result to the control section 211. Note that when detecting no image change in step S203, the inference engine 212 shifts the processing to step S211 to determine whether a photographing operation has been performed. When the insertion is correctly performed as shown in FIG. 18, the inference engine 212 infers that the change is a smooth change. In this case, the control section 211 shifts the processing from step S205 to step S211 to determine whether a photographing operation has been performed.

Here, it is assumed that the insertion of the insertion portion is as shown in FIG. 19. FIG. 19 shows a state of insertion when it is inferred that the insertion portion is not correctly inserted according to a method similar to the method described with reference to FIG. 18. In the example of FIG. 19, the distal end portion 223a advances in the direction to the deep portion 243 until a time point when images P211 to P214 are picked up. At a time point when an image P215 is picked up, the distal end portion 223a advances in a direction to the inner wall of the pipe 241 because the advance direction of the distal end portion 223a is deviated from the side of the deep portion 243. As a result, the image 243a of the deep portion 243 is deviated from the center of the image, and at a time point when an image P216 is picked up, the image 243a of the deep portion 243 is significantly deviated from the center of the image to the extent that a collision between the distal end portion 223a and the inner wall of the pipe 241 is expected. A display 244 indicating an expected position of the collision between the distal end portion 223a and the inner wall of the pipe 241 is also displayed in the image P216.

When the insertion shown in FIG. 19 is performed, the inference engine 212 outputs, to the control section 211, an inference result indicating that a non-smooth change occurs in the pickup image in step S204. In step S205, the control section 211 determines that the change in the pickup image is not a smooth change, and shifts the processing to step S206. In step S206, the display control section 211f causes the display section 215 to display, on the display screen, a warning display indicating that the insertion is not correctly performed. Note that the control section 211 may cause an alarm sound to be generated. Next, in step S207, the control section 211 determines whether the operation is continued. For example, the control section 211 can determine based on image analysis on the pickup image whether the movement of the distal end portion 223a is continued. The control section 211 determines that the operation is not continued, for example, when the advance of the distal end portion 223a is stopped, and returns the processing to step S201.

On the other hand, when the control section 211 determines that the operation is continuing, in step S208, the control section 211 determines that the warning has been ignored, and automatically performs photographing, and records evidence. In other words, the pickup image which has been subjected to signal processing by the image processing section 211b is recorded in the image data recording region 216a of the recording section 216 by the recording control section 211c. The setting control section 211d generates inference model use information indicating that the inference by the inference engine 212 has been ignored and not used, and provides the information to the recording control section 211c. As a result, the recording control section 211c records the inference model use information as meta data of the pickup image to be recorded in the image data recording region 216a. Based on the recorded pickup image and the inference model use information, it is clarified that the insertion of the distal end portion 223a is continued while ignoring the inference result indicating that the distal end portion 223a is not correctly inserted, and the image of the endoscope at that time is also clarified.

In the next step S209, the control section 211 determines whether the photographing and recording in step S208 have been repeated by a predetermined number of times. When the repeating frequency of the photographing and recording in step S208 has not reached the predetermined number of times, the control section 211 shifts the processing to step S211. When the repeating frequency of the photographing and recording in step S208 have reached the predetermined number of times, the control section 211 determines that a problem occurs in the method of presenting the warning, and changes the warning method in the next step S210. For example, the warning presenting method is changed by increasing the size of the warning display, changing the color, changing the timing, or generating not only the warning display, but also a warning sound or changing the volume of the sound.

In the next step S211, the control section 211 determines whether a photographing operation has been performed. When the photographing operation has not been performed, the control section 211 returns the processing to step S201. On the other hand, when the photographing operation has been performed, the control section 211 performs photographing and recording in step S212.

FIG. 17 is a diagram showing a method of creating the inference model described above. Images when an endoscope is inserted are stored in the external image DB 232 of the external equipment 230. In step S221, the population creation section 231a of the learning section 231 sets image changes during insertion as a population. In step S222, the input/output modeling section 231d sets image changes during successful insertion (OK) as teacher data, and in step S223, sets image changes during failure insertion (NG) as teacher data, thereby generating an inference model (step S224). When request data exists, the learning section 231 performs inference using the request data (step S225). The input/output modeling section 231d determines whether the reliability of the inference in step S225 is equal to a predetermined value or more (step S226).

When the reliability is not equal to the predetermined value or more, the input/output modeling section 231d shifts the processing to step S227 to reset the learning matrix and the like, and then shifts the processing to step S224 to generate an inference model. When the reliability becomes equal to the predetermined value or more, the input/output modeling section 231d shifts the processing to step S228 transmit the generated inference model to the image acquisition device 210 via the communication section 231b. As a result, an inference model for determining whether the insertion has been correctly performed is stored in the inference engine 212 of the image acquisition device 210.

Note that plural inference models (dictionaries) are allowed to be stored in the inference engine 212, and the inference engine 212 includes an inference model for each insertion object of the insertion portion. The setting control section 211d can change the inference model to be used for each insertion object.

As described above, in the present embodiment, inference is performed by using an inference model, and inference model use information indicating whether an inference result is adopted and also which interference model is adopted when the interference result is adopted is recorded. The inference result based on the inference model is not necessarily effective. By recording inference model use information, it is possible to facilitate determination on a border as to whether the inference model is valid or not, and it is possible to clarify a use range of an inference model and to promote an effective reason for the inference model. Moreover, when the inference result based on the inference model is ignored by a predetermined number of times or more, it is possible to determine that the warning method based on the inference result is inappropriate, which contributes to an improvement of the warning method or the like.

In the case of the embodiment, it is registered in the inference function and operation related database 216c that the operation such as the insertion operation or the stop operation is an operation which causes the inference result to be unadopted with respect to the inference function such as the guide display. Note that such an insertion operation or a stop operation can be determined from a change in a pickup image. Furthermore, with respect to the inference function, an operation of pushing a button of "failure" by the user may be included in the database.

Third Embodiment

Figure 20:
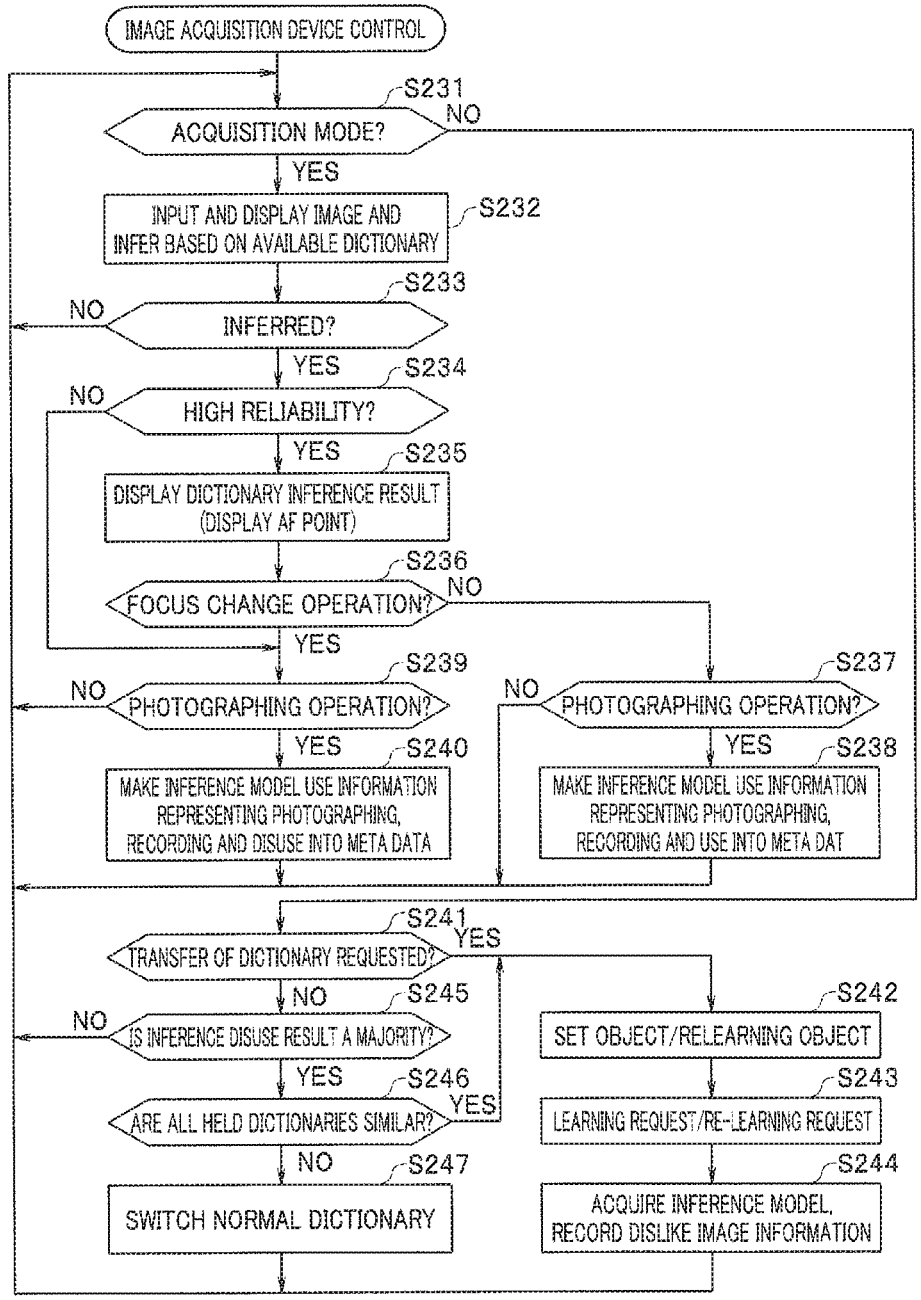
FIG. 20 is a flowchart showing an operation flow adopted in a third embodiment of the present invention.
Figure 21:
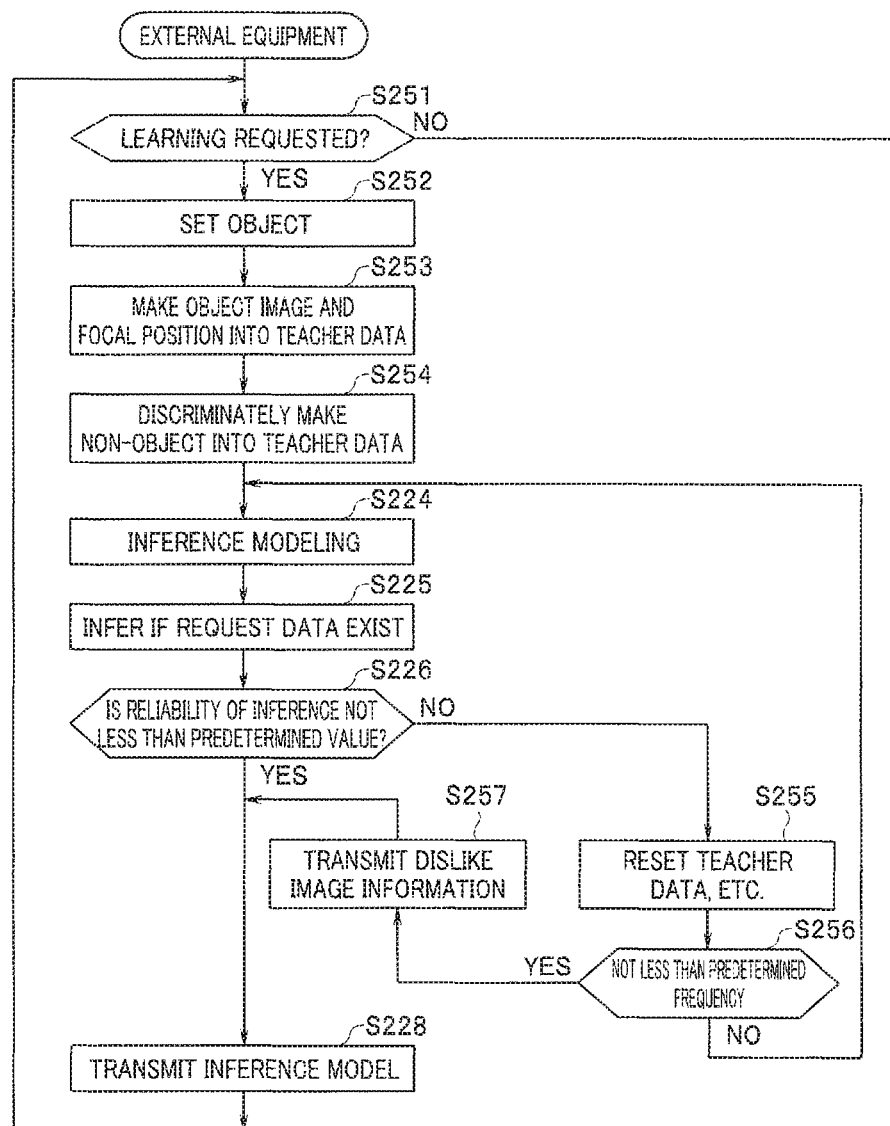
FIG. 21 is a flowchart showing an operation flow adopted in the third embodiment of the present invention.

FIGS. 20 and 21 are flowcharts showing an operation flow adopted in a third embodiment of the present invention. A hardware configuration of the present embodiment is similar to the hardware configuration of FIG. 14. The present embodiment shows an example in which a digital camera is configured by the image pickup apparatus 220 of FIG. 14.

Figure 22:
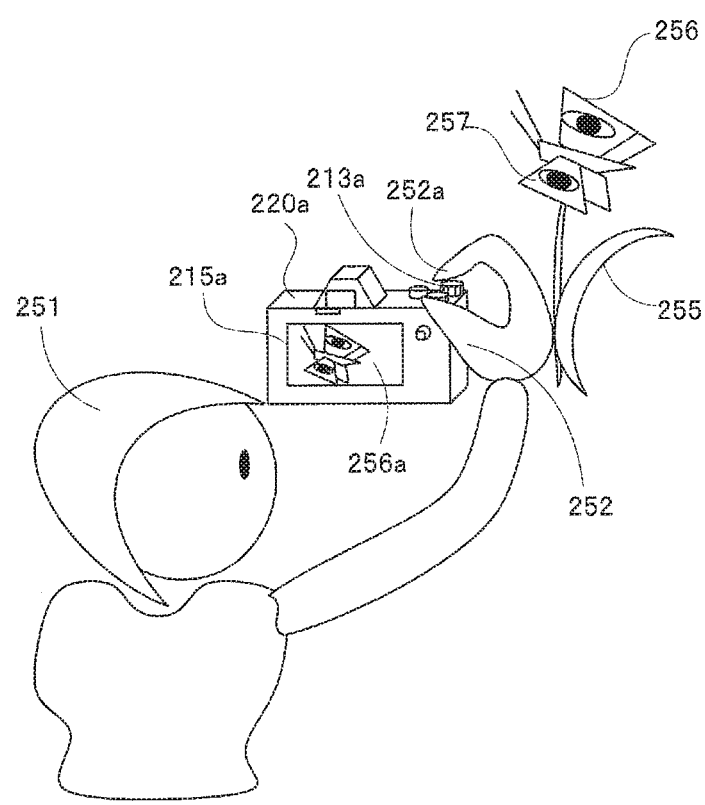
FIG. 22 is a diagram showing an aspect in which an object is imaged by an image pickup apparatus 220 of FIG. 14.

FIG. 22 is a diagram showing a state where image pickup is performed on an object by the image pickup apparatus 220 of FIG. 14. Each section of the image pickup apparatus 220 of FIG. 14 is accommodated in a housing 220a of FIG. 22. A display screen 215a configuring a display section 215 is arranged on a back surface of the housing 220a. A lens, which is not shown, configuring the optical system 222b is arranged on a front surface of the housing 220a, and a shutter button 213a configuring the operation section 213 is arranged on a top surface of the housing 220a.

FIG. 22 shows an example in which a grayling (butterfly) 256 perching on a plant 255 is photographed as an object. For example, a user 251 holds the housing 220a with a right hand 252, and photographs the butterfly 256 by pushing down a shutter button 213a with a finger 252a of the right hand under a state where the butterfly 256 is captured in a visual-field range while viewing the display screen 215a of the display section 215. Note that the butterfly 256 has a pattern similar to the pattern of a human's eye on each wing 257.

In the present embodiment, an inference model is used to determine an object used for focus control. That is, an inference model for detecting a focus control target is stored in the inference engine 121. For example, it is assumed that an inference model for detecting a human's eye (hereinafter referred to as a human dictionary) is stored in the inference engine 212.

In step S231 in FIG. 20, the control section 211 determines whether an image acquisition mode is specified. When the image acquisition mode is specified, the control section 211 performs image input and display in step S232. In other words, the image pickup section 222 picks up an image of an object, and the control section 211 takes in the pickup image from the image pickup section 222, provides the pickup image as a through image to the display section 215, and causes the display section 215 to display the pickup image.

In the present embodiment, the setting control section 211d causes the inference engine 212 to execute inference for detection of a focus control target. The inference engine 212 detects an image portion of a human's eye as a focus control target from the pickup image by using an inference model (human dictionary) stored in the storing section 212a. The inference engine 212 outputs an inference result to the control section 211.

Figure 23:
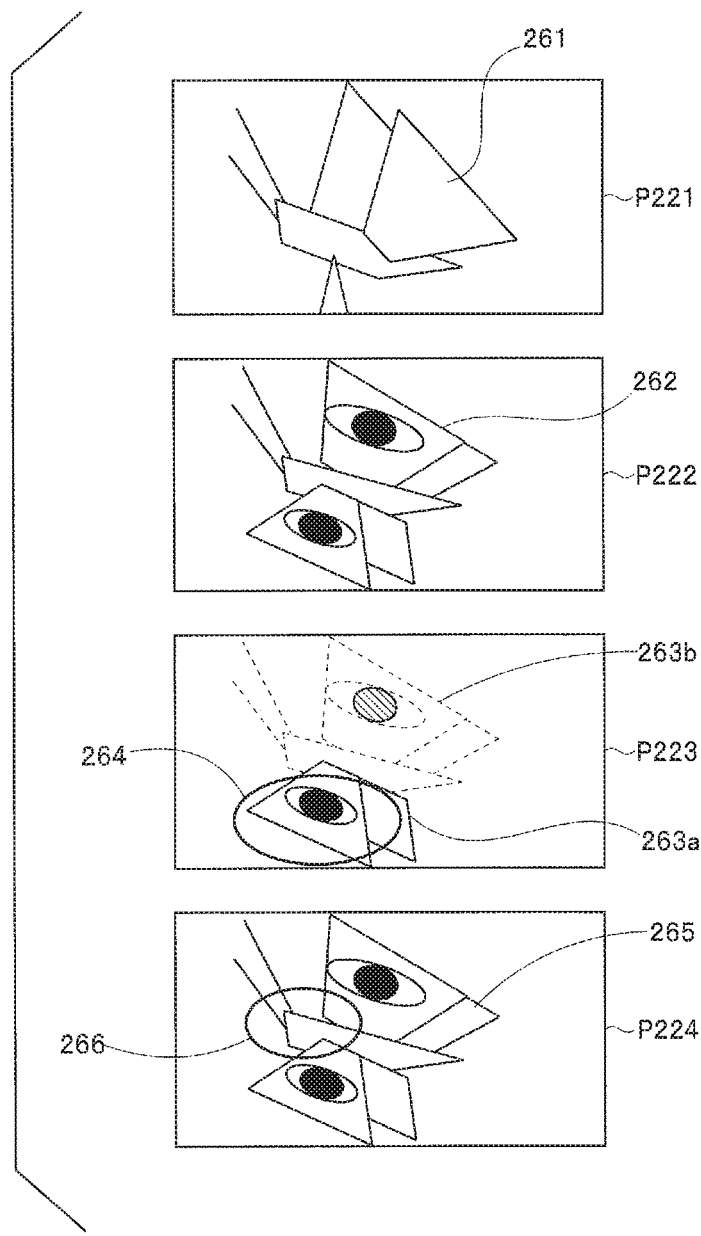
FIG. 23 is a diagram showing a pickup image displayed on a display screen 215a of a display section 215.

FIG. 23 is a diagram showing a pickup image displayed on the display screen 215a of the display section 215. As mentioned above, the user 251 is trying to photograph the butterfly 256 on the plant 255. An image P221 shows a through image at a certain moment. An image 261 of the butterfly 256 is displayed in the through image displayed on the display screen 215a. At the time point, the inference engine 212 has provided the control section 211 with an inference result indicating that the image is low in reliability as an eye image. The control section 211 determines whether the inference has been performed in step S233, and when an inference result is obtained, it is determined in step S234 whether the inference result having reliability higher than a predetermined threshold is acquired. In this case, since the reliability is low, the control section 211 shifts the processing to step S239 to determine whether a photographing operation has been performed. When the photographing operation has not been performed, the control section 211 returns the processing to step S231.

Next, it is assumed that the image P222 in FIG. 23 is displayed as a through image on the display screen 215a. The image P222 contains an image 262 of the butterfly 256 which has spread wings. The image 262 includes an image portions similar to human's eyes, and the inference engine 212 infers that the pattern of the wings corresponds to the image portion of the human's eyes. As a result, the inference engine 212 outputs an inference result having reliability higher than the predetermined threshold value to the control section 211.

At the time, in step S234, the control section 211 determines that the inference result of the inference engine 212 has high reliability, and shifts the processing to step S235. In step S235, the setting control section 211d controls the display control section 211f to display the inference result. The display control section 211f displays, as an inference result, a frame image 264 indicating a position at which an image portion of an eye is detected is displayed (an image P223 in FIG. 23). The frame image 264 indicates a focus position (AF point) in the focus control.

When autofocus is set, the setting control section 211d provides the image pickup control section 211a with information indicating that the image portion of the eye detected by the inference is set as a focus position. The image pickup control section 211a controls to drive the optical system 222b so that the optical system 222b is focused on the indicated focus position. As a result, a pickup image which is in focus at the image portion of the eye detected by the inference can be obtained.

The image P223 in FIG. 23 shows a through image displayed on the display screen 215a in the case, and it has an in-focus image portion 263a and an out-focus image portion 263b (a broken line portion). By using a human (person determination or face detection) dictionary for detecting a human's eye, the image P223 becomes an image which is focused on the pattern portion of the wing of the butterfly 256, and thus it is considered that the image P223 is not an in-focus image which the user wishes.

Therefore, it is assumed that the user 251 performs an operation of changing the focus by using the operation section 213, for example, a dial operation. In step S236, the control section 211 determines the presence or absence of the focus change operation by the user. When detecting the focus change operation, the control section 211 shifts the processing to step S239. In step S239, the control section 211 determines whether an operation for photographing has been performed. When the operation for photographing has not been performed, the control section 211 returns the processing to step S231. When an operation for photographing has been performed, the control section 211 shifts the processing to step S240 to perform photographing. The step S240 is executed when photographing is performed not by adopting the focus control based on the inference result by the inference model (the human (person determination or face detection) dictionary), but by performing the focus control based on the focus change operation by the user. In step S240, the control section 211 performs photographing and records evidence regarding the use of inference. That is, the pickup image which has been subjected to signal processing by the image processing section 211b is recorded in the image data recording region 216a of the recording section 216 by the recording control section 211c. The setting control section 211d generates inference model use information indicating that the inference by the inference engine 212 has not been used, and provides the information to the recording control section 211c. As a result, the recording control section 211c records the inference model use information as meta data of the pickup image to be recorded in the image data recording region 216a. Based on the recorded pickup image and the inference model use information, it is clarified that the photographing has been performed not by adopting the inference using the inference model stored in the inference engine 212, but according to the focus change operation performed uniquely by the user.

However, it is important to determine an operation of the operation section corresponding to a function item identical or similar to a function item which is automatically set by using an inference model. Even when an operation unrelated to the output of an inference model is performed, it does not mean dissatisfaction for an inference result, and thus it does not reflect a history indicating that it was not used for the inference model use information. In other words, in the image acquisition device, in order for the determination section to correctly determine, according the operation result of the operation section and the presentation content of the inference result, whether the inference result is adopted or not, it is important for the determination section to make determination as to whether the operation of the operation section affects an item related to the presentation content of the inference result, and whether the inference result has been adopted is determined in consideration of a range in which the inference section participates. This is performed according to whether a selection result for the presentation result is good or not, and user's determination as to whether the presentation result is good or not may be performed based on the type of an operation subsequent to the display of the result or with voice. The relationship between "operation type" and "good or not" for discriminating "good or bad" of the operation subsequent to the display may be recorded as a database in the recording section so that the database is allowed to be referred to. For example, when a focusing operation is being performed for a focusing result (whether focusing is correctly performed, display of a focused position satisfies a user's intention, a focal position, a display result or the like), it may be considered that rejection of the inference result has been determined. In order to make such determination, it is preferable to provide the recording section with an inference function and operation related database which makes it possible to know what control the inference is connected to and what operation section the inference is related to. For example, since face detection is used for focusing, a function to be controlled by face detection is focusing, and a focus ring or the like serves as an operation section corresponding to the function. With respect to the display function of a portion to be focused as described later, for example, focus switching by a touch panel may be considered as a corresponding operation.

It is assumed that the user is not satisfied with focus control using a human dictionary, but asks for focus control using another dictionary (inference model). In this case, the user operates the operation section 213 to terminate an acquisition mode, and causes a menu related to dictionaries to be displayed. When the operation is performed, the control section 211 controls the display control section 211f to display the dictionary menu on the display screen 215a of the display section 215.

Figure 24:
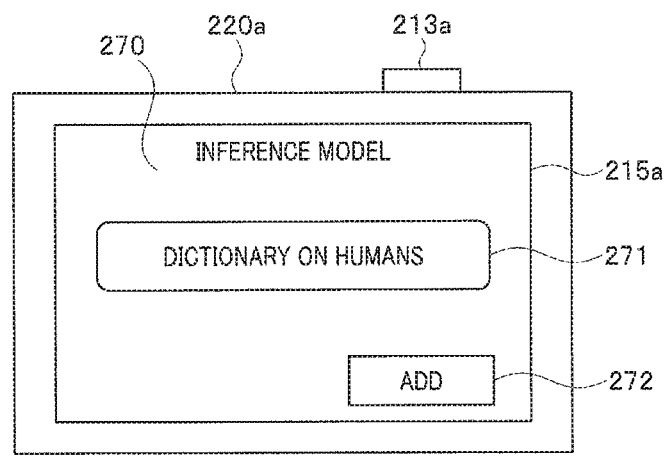
FIG. 24 is a diagram showing a dictionary menu screen.
Figure 25:
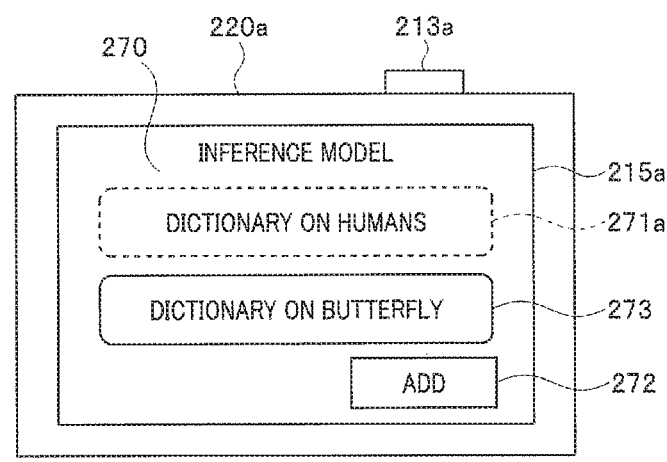
FIG. 25 is a diagram showing a dictionary menu screen.

FIGS. 24 and 25 are diagrams showing a dictionary menu screen 270. An inference model (dictionary) registered in the inference engine 212 is displayed on the dictionary menu screen 270. In the example of FIG. 24, it is shown that only the human dictionary is registered with an icon 271 expressed by "human dictionary". The user 251 operates an addition button 272 in order to add a dictionary suitable for photographing the butterfly 256. For example, when a touch panel, which is not shown, is arranged on the display screen 215a, the user 251 performs a touch operation on the addition button 272.

The control section 211 determines in step S241 whether transfer of a dictionary is requested. When the addition button 272 is operated, the control section 211 determines that the user desires transfer of a new dictionary, and shifts the processing to step S242. In step S242, the display control section 211f causes a setting screen for objects and a setting screen for relearning objects to be displayed, and enables the user to specify an object and specify a relearning object. The control section 211 sends a learning request or a relearning request for the object or the relearning object specified by the user to the external equipment 230.

FIG. 21 shows processing of creating an inference model in the external equipment 230. In FIG. 21, the same steps as the steps in FIG. 17 are represented by the same reference signs, and description on the steps is omitted. The learning section 231 of the external equipment 230 determines in step S251 whether a learning request or a relearning request has been received from the control section 211 of the image acquisition device 210 via the communication sections 214 and 231b. When receiving the learning request or the relearning request, the learning section 231 sets an object contained in the request content in step S252. For example, it is assumed that a learning request of a dictionary of batteries has been received from the control section 211 based on an operation of the user 251. In this case, in step S253, the population creation section 231a sets an image of a butterfly as an object image and a focus position as teacher data. In step S254, the population creation section 231a sets images other than the object image as teacher data separately from the object image.

The input/output modeling section 231d generates an inference model by learning using the teacher data generated in steps S253 and S254 (step S224). The learning section 231 performs inference using request data in step S225, and determines whether the reliability of the inference is equal to a predetermined value or more (step S226).

If the reliability is not equal to the predetermined value or more, the input/output modeling section 231d shifts the processing from step S226 to step S255 to reset teacher data, etc., and then determines in step S256 whether resetting is performed by a predetermined number of times or more. When the resetting has not been performed by the predetermined number of times or more, the input/output modeling section 231d returns the processing to step S224. When the resetting has been performed by the predetermined number of times or more, the input/output modeling section 231d shifts the processing from step S256 to step S257 to determine that the image of the object is an unfit image unsuitable for inference, transmits unfit image information to the image acquisition device 210, and then shifts the processing to step S228. When determining in step S226 that the reliability has reached a predetermined value or more, the input/output modeling section 231d shifts the processing to step S228.

As described above, the learning section 231 transmits the inference model having the reliability of the predetermined value or more or the inference model corresponding to the unfit image information to the image acquisition device 210 via the communication section 231b. In step S244, the control section 211 of the image acquisition device 210 stores the received inference model into the inference engine 212 and records the unfit image information in the recording section 216.

FIG. 25 shows a dictionary menu screen 270 displayed on the display screen 215a in the above case. In the example of FIG. 25, a human dictionary is registered by an icon 271a expressed by "human dictionary", and a butterfly dictionary is registered by an icon 273 expressed by "butterfly dictionary" on the dictionary menu screen 270. The icon 271a and the icon 273 in FIG. 25 are displayed so that different displays are respectively performed by a broken line and a solid line, and the broken line indicates that the dictionary is not selected while the solid line indicates that the dictionary is selected. Note that the user performs a touch operation on the icon, thereby selecting the dictionary corresponding to the touched icon.

An image P224 in FIG. 23 shows a through image displayed on the display screen 215a when focus control is performed by using the butterfly dictionary in the acquisition mode. The inference engine 212 uses the butterfly dictionary to infer and detect the image portion of the butterfly 256 from the image P224, and provides the control section 211 with information on the focus position to be set for picking up an image of the butterfly and information on various photographing parameters to be set for picking up an image of the butterfly as an inference result. The image pickup control section 211a controls the image pickup section 222 according to the inference result. As a result, an image 265 in which the entire butterfly 256 is in focus is displayed in the image P224 on the display screen 215a, and a frame image 66 indicating the focus position set for the detected butterfly is displayed as an inference result using the butterfly dictionary.

Here, it is assumed that the user 251 pushes the shutter button 213a without performing the focus change operation by himself. In other words, in this case, the control section 211 detects a photographing operation in step S237 subsequent to step S236. In the next step S238, the control section 211 performs photographing and records evidence about use of inference. In other words, a pickup image which has been subjected to signal processing by the image processing section 211b is recorded in the image data recording region 216a of the recording section 216 by the recording control section 211c. The setting control section 211d generates inference model use information containing information such as a dictionary ID indicating that the inference by the inference engine 212 is used and the used dictionary is the butterfly dictionary, and provides the inference model use information to the recording control section 211c. As a result, the recording control section 211c records the inference model use information as meta data of the pickup image to be recorded in the image data recording region 216a. It is clarified from the recorded pickup image and the inference model use information that the photographing is performed by adopting the inference using the butterfly dictionary stored in the inference engine 212.

Note that the example in which the user explicitly adds a dictionary is shown in the foregoing description, but it is possible to automatically add a dictionary without any operation being performed by the user. When transfer of a dictionary is not requested in step S241, the control section 211 determines based on the recorded inference model use information in step S245 whether inference rejecting results occupy a majority. With respect to a set dictionary, when the frequency at which inference results have not been adopted is larger than the frequency at which inference results have been adopted, in step S246, the control section 211 determines whether inference rejecting results occupy a majority with respect to all dictionaries held in the inference engine 212.

When the control section 211 does not determine that the inference rejecting results occupy a majority for all the held dictionaries, the control section 211 shifts the processing to step S247, switches a normal dictionary to another dictionary, and returns the processing to step S231. On the other hand, when the inference rejecting results occupy a majority with respect to all the held dictionaries, the control section 211 determines that the inference engine 212 does not store any dictionary suitable for the focus control of objects that the user prefers to photograph, and shifts the processing to step S242 to request the external equipment 230 to create and transfer a dictionary. Note that in this case, the control section 211 may prompt the user to specify the type of a dictionary requested in step S242, that is, specify an object to be detected with a dictionary. Step S242 may be omitted, and even when the user does not specify any object, an object may be automatically specified to request creation and transfer of a dictionary. For example, the control section 211 may determine by image analysis of a pickup image which object a main object is, and request creation and transfer of a dictionary for detecting the object based on a determination result.

When the control section 211 determines by the image analysis of the pickup image, for example, that the frequency of photographing of a butterfly is high, the control section 211 may determine in step S236 that the focus change operation is repeated by a predetermined number of times, and set that the butterfly dictionary is prioritized.

Note that an appearance of an image is remarkably different depending on a tint of the image. Therefore, the control section 211 may determine the tint of the pickup image by the image analysis of the pickup image and perform control that the inference model to be used is switched according to the determined tint. By accumulating inference model use information on whether an inference model to be used in the case is adopted or unadopted, an inference model to be selected can be easily determined according to the tint.

As described above, in the present embodiment, an effect similar to the effect of the second embodiment can be obtained. Furthermore, in the present embodiment, it is possible not only to change an inference model to be used based on the user operation, but also to automatically switch an inference model to be used based on determination based on inference model use information or to request a new inference model to the external equipment and automatically incorporate and use the inference model. By recording the inference model use information as described above, it is possible to determine the effectiveness and use range of inference models and promote effective use of the inference models.

In the future, guides, automatic control, and semi-automatic control using AI will be used for various devices, but "the inference function and operation related database" as described above is important for devices and equipment in any field. By considering what control of which function an inference result affects and how the inference result affects the user and inputting whether the user is satisfied with the guide, automatic control or semi-automatic control it can be determined whether the function is effective or not. In other words, it is impossible to know whether an inference model is fit to the user unless it is determined what operation cancels a function that has been performed or is being performed by the inference. In the case of an image pickup section for an automatic operating vehicle, a case where an inference result causes a user to step on a brake or the like during movement of the vehicle is a situation suitable for verifying the effectiveness of the inference model like the present invention. When such a situation occurs frequently, the inference mold should be customized for the user. It is impossible to even determine the need for such customization correctly without any device as disclosed by the present invention. In the case of a camera, when the user has erased an image captured by using an inference model with high probability, it can be determined that the inference model is inappropriate. For the purpose, it is necessary to provide a mechanism for determining whether the image has been captured with an inference model, and in this case, a record in which the inference function is automatic photographing and the related operation is an image erasing operation may be registered in the "inference function and operation related database". Note that in the example, it is necessary to record inference model use information independently of a target image. Alternatively, when the inference model use information is recorded as meta data of the image, before the image is erased, meta data indicating that the image was captured with the inference model may be outputted to an external analysis server together with information indicating that the image has been erased. The server can analyze acquired inference model use information to determine whether a new inference model is necessary. In the case of a camera that uses an inference model to present a guide indicating a photographing opportunity, when it is determined that photographing is not performed for the indication, an operation of a release switch or the like is a related operation. Furthermore, even when the inference model is fit to the user, the determination can be made by the same device. When an image captured with an inference model is always reproduced many times, it can be determined that the user likes the inference model. The same can be applied in the case where an image is always backed up somewhere. As described above, the related operation is not limited to one operation, and certain inference is not limited to be related to only a single function. When a face is detected, not only focus, but also exposure may be adjusted. In this case, the "inference function and operation related database" may have two functions and multiple related operations. Needless to say, the relationship between the use of the inference engine and the user operation may be determined by a specific program instead of a database, and a case where determination is performed by weighting with a specific calculation formula is also included in the technical scope of the present invention.

Note that in the above embodiment, the image acquisition device requests the external equipment to create and transfer an inference model. However, creation of an inference model may be performed by any device, for example, a computer on a cloud may be used.

The foregoing embodiment has been described by using the digital camera as the equipment for image pickup. The camera may be a digital single-lens reflex camera or a compact digital camera, or a camera for moving pictures such as a video camera and a movie camera. Furthermore, a camera built in a portable information terminal (PDA: personal digital assist) such as a cellular phone or a smart phone may be used. The image pickup section may be separate from the image acquisition apparatus. For example, a machine which is configured so that the machine itself does not move, but only an image pickup section moves is within the assumption. In an application such as observation of microorganisms, a microscope or stage may move. The example of the endoscope has been described, but the present invention is also applicable to observation apparatuses such as a capsule endoscope and a CT scanner.

In recent years, artificial intelligence capable of determining various kinds of determination criteria in a lump is often used, and it goes without saying that an improvement of performing respective branches of the flowcharts shown here in a lump is also within the scope of the present invention. When the user is enabled to input whether the control as described above is good or not, by learning user's preference, it is possible to customize the embodiment shown in the present application in a direction suitable for the user.

Note that although the description is made by using "first", "next", etc. for convenience's sake with respect to the operation flows in claims, the specification, and the drawings, it does not mean that it is essential to perform the operation flows in the order. Needless to say, the respective steps constituting the operation flows can be appropriately omitted for portions which do not affect the essence of the invention.

Note that with respect to the control mainly described for the flowcharts in the techniques described here, the control is often settable by programs, and may be stored in a recording medium or a recording section. A manner of recording in the recording medium or the recording section may be recording at the time of shipment of products, may use a distributed recording medium, or may be downloading via the Internet.

Note that in the embodiments, the portion described as "section" (or unit) may be configured by a dedicated circuit or combining plural general-purpose circuits, or as needed, it may be configured by a processor such as a microcomputer, or a CPU which operates according to pre-programmed software, or combining sequencers such as an FPGA. It is possible to perform design such that an external device takes over all or part of the control, and in this case, a wired or wireless communication circuit intervenes. Communication may be performed via Bluetooth, Wi-Fi, a telephone line or the like, and may be also performed via USB or the like. A dedicated circuit, a general-purpose circuit, and a control section may be integrally configured as an ASIC. A moving section and the like are configured by various actuators and a coupling mechanism for movement as needed, and the actuator is operated by a driver circuit. The drive circuit is also controlled by a microcomputer, ASIC or the like according to a specific program. Such control may be subjected to detailed correction, adjustment or the like based on information outputted by various kinds of sensors and peripheral circuits of the sensors. In the foregoing embodiments, the determination is performed based on a learning result determined by artificial intelligence in the terms of an inference model or a learned model. However, this may be substituted by simple flowcharts, condition branching, numerical determination involving calculation, or the like. The learning of the machine learning may be performed in the image pickup apparatus by improving the calculation capability of the control circuit of the camera or by focusing on a specific situation or an object.

In the embodiment of the present invention, the operation in the present embodiment has been described by using flowcharts. However, the processing procedure may be changed in the order, any step may be omitted, a step may be added, and further specific processing contents in the respective steps may be changed.

The present invention is not limited to the foregoing embodiments themselves, and the components may be modified and embodied without departing from the scope of the invention in the implementation stage. In addition, various inventions can be made by appropriately combining plural components disclosed in the foregoing embodiments. For example, some components of all the components shown in the embodiments may be deleted.

Furthermore, components over the different embodiments may be combined appropriately. Particularly, operations using biological reactions including voice recognition, etc. need appropriate sensors, interfaces, and determination circuits, which have not been described in order to avoid complicated description, but it is noted that the present invention can be achieved by various improved techniques and alternative techniques which can be substituted for manual operations by the user.

(Supplemental Item 1)
An image acquisition device including:
an image acquisition section configured to acquire an image;
an inference section configured to perform inference with an input of the image acquired by the image acquisition section by using a predetermined inference model;
a presentation section configured to present an inference result of the inference section;
a determination section configured to determine whether the inference result is adopted or not according to whether a selection result for the presentation result is good or not; and
a control section configured to create use information on use of the inference model based on a determination result of the determination section, and record the created use information as meta data of the image acquired by the image acquisition section.

(Supplemental Item 2)
The image acquisition device according to the supplemental item 1 including an operation section that is operated by a user, and the determination section determines according to an operation result of the operation section and a presentation content of the inference result whether the inference result is adopted or not.

(Supplemental Item 3)
The image acquisition device according to the supplemental item 2, wherein the determination section determines whether the inference result is adopted according to whether an operation of the operation section affects an item related to the presentation content of the inference result.

(Supplemental Item 4)
The image acquisition device according to the supplemental item 1, wherein the inference section includes plural inference models, and the control section records the use information as the meta data with information indicating which inference model is used by an adopted inference result.

(Supplemental Item 5)
The image acquisition device according to the supplemental item 1, wherein when a determination result indicating that the inference result is not adopted is obtained by the determination section, the control section automatically records the image acquired by the image acquisition section together with the metadata.

(Supplemental Item 6)
The image acquisition device according to the supplemental item 1, wherein the presentation section issues a warning when a determination result indicating that the inference result is not adopted is obtained by the determination section.

(Supplemental Item 7)
The image acquisition device according to the supplemental item 6, wherein the presentation section changes a warning method and issues a warning when a determination result indicating that the inference result is not adopted is obtained by a predetermined number of times or more by the determination section.

(Supplemental Item 8)
The image acquisition device according to the supplemental item 1, wherein the presentation section includes a display section configured to display the image, and displays an indication representing the inference result on the display section.

(Supplemental Item 9)
The image acquisition device according to the supplemental item 1, wherein when a determination result indicating that the inference result is not adopted is obtained by the determination section, the control section requests external equipment to create and transfer a new inference model used by the inference section.

(Supplemental Item 10)

The image acquisition device according to the supplemental item 1, wherein the control section performs control of switching an inference model used by the inference section when a determination result indicating that the inference result is not adopted is obtained by a predetermined number of times or more by the determination section, and requests external equipment to create and transfer a new inference model used by the inference section when a determination result indicating that the inference result is not adopted is obtained by a predetermined number of times or more by the determination section for all inference models.

(Supplemental Item 11)

An image acquisition method including:

an image acquisition step of acquiring an image;

an inference step of performing inference with an input of the image acquired in the image acquisition step by using a predetermined inference model;

a presentation step of presenting an inference result of the inference step;

a determination step of determining whether the inference result is adopted or not; and a control step of creating use information on use of the inference model based on a determination result in the determination step, and recording the created use information as meta data of the image acquired in the image acquisition step.

(Supplemental Item 12)

An image acquisition program for causing a computer to execute:

an image acquisition step of acquiring an image;

an inference step of performing inference with an input of the image acquired in the image acquisition step by using a predetermined inference model;

a presentation step of presenting an inference result of the inference step;

a determination step of determining whether the inference result is adopted or not; and a control step of creating use information on use of the inference model based on a determination result in the determination step, and recording the created use information as meta data of the image acquired in the image acquisition step.

What is claimed is:

1. A learning device comprising a processor, wherein the processor sets, as a population, a series of plural images that are obtained time-sequentially by photographing a specific target in an attempt to photograph the specific target, and
generates an inference model by using, as teacher data, a series of images selected from the set population based on whether the specific target can be photographed in a desired state, and guide information corresponding to one or plural images that constitute the selected series of images, the guide information providing information relating to a change of a photographing range for causing the specific target to be photographable in the desired state.

2. The learning device according to claim 1, wherein the processor sets, as second teacher data, the series of images when the specific target cannot be photographed in the desired state.

3. The learning device according to claim 1, wherein the processor divides the teacher data into second teacher data when it is impossible to draw an inference including predetermined reliability from a learning result.

4. The learning device according to claim 1, wherein
each image in the plural images is associated with date and time information and/or position information, and
the processor generates an inference model for determining based on the date and time information and/or the position information whether a manner of the change of the photographing range for causing the specific target to be photographable in the desired state is good or bad.

5. The learning device according to claim 1, wherein the processor generates an inference model for outputting a warning display when a position of the photographing range moves away from a position of the specific target.

6. The learning device according to claim 1, wherein the processor uses difference data between respective images of the plural images obtained time-sequentially to generate the guide information.

7. The learning device according to claim 1, wherein the processor uses the plural images as the teacher data and generates an inference model for estimating the specific target.

8. The learning device according to claim 1, wherein the processor uses the plural images as the teacher data and generates an inference model for inferring whether photographing of the specific target is successful or unsuccessful.

9. An image pickup apparatus comprising:

a memory configured to store the inference model according to claim 1;

an image sensor configured to convert an object into image data; and a processor, wherein the processor is configured to receive the image data and perform inference by using the inference model stored in the memory.

10. The image pickup apparatus according to claim 9, comprising a display device configured to display an inference result of the processor.

11. An image processing device comprising:

an image sensor configured to convert an object into image data;

a memory configured to store an inference model generated by setting, as a population, a series of plural images obtained time-sequentially by photographing a specific target in an attempt to photograph the specific target, and using, as teacher data, a series of images selected from the set population based on whether the specific target can be photographed in a desired state, and guide information corresponding to one or plural images that constitute the selected series of images, the guide information providing information relating to a change of a photographing range for causing the specific target to be photographable in the desired state; and a processor, wherein the processor is configured to use the inference model stored in the memory, receive the image data outputted from the image sensor, and guide to a manner of the photographing range for causing the specific target to be photographable in the desired state.

12. A learning method comprising:

setting, as a population, a series of plural images obtained time-sequentially by photographing a specific target in an attempt to photograph the specific target; and generating an inference model by using, as teacher data, sequential images selected from the set population based on whether the specific target can be photographed in a desired state, and guide information corresponding to one or plural images that constitute the selected series of images, the guide information providing information relating to a change of a photographing range for causing the specific target to be photographable in the desired state.

13. A non-transitory computer-readable recording medium recording a learning program generated by
setting, as a population, a series of plural images obtained time-sequentially by photographing a specific target in an attempt to photograph the specific target, and
generating an inference model by using, as teacher data, a series of images selected from the set population based on whether the specific target can be photographed in a desired state, and guide information corresponding to one or plural images that constitute the selected series of images, the guide information providing information relating to a change of a photographing range for causing the specific target to be photographable in the desired state.

14. A display control method comprising:
storing an inference model generated by setting, as a population, a series of plural images obtained time-sequentially by photographing a specific target is in an attempt to photograph the specific target and using, as teacher data, a series of images selected from the set population based on whether the specific target can be photographed in a desired state, and guide information corresponding to one or plural images that constitute the selected series of images, the guide information providing information relating to a change of a photographing range for causing the specific target to be photographable in the desired state;
converting an object into image data; and
displaying an inference result by the stored inference model on a display section when the object is converted into the image data.

15. A method of manufacturing an inference model comprising
a setting step of setting, as a population, a series of plural images obtained time-sequentially by photographing a specific target in an attempt to photograph the specific target; and
a generating step of generating an inference model by using, as teacher data, sequential images selected from the set population based on whether the specific target can be photographed in a desired state, and guide information corresponding to one or plural images that constitute the selected series of images, the guide information providing information relating to a change of a photographing range for causing the specific target to be photographable in the desired state.

* * * * *